United States Patent
Shibata et al.

(10) Patent No.: US 9,555,692 B2
(45) Date of Patent: Jan. 31, 2017

(54) REGISTER FOR AIR CONDITIONING

(71) Applicant: TOYODA GOSEI CO., LTD., Kiyosu-shi, Aichi-ken (JP)

(72) Inventors: Minoru Shibata, Kiyosu (JP); Nobuhiro Terai, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 320 days.

(21) Appl. No.: 14/303,288

(22) Filed: Jun. 12, 2014

(65) Prior Publication Data

US 2015/0065031 A1 Mar. 5, 2015

(30) Foreign Application Priority Data

Aug. 28, 2013 (JP) .................................. 2013-177330

(51) Int. Cl.
*B60H 1/34* (2006.01)

(52) U.S. Cl.
CPC ..... *B60H 1/3421* (2013.01); *B60H 2001/3471* (2013.01)

(58) Field of Classification Search
CPC .................. B60H 1/3421; B60H 2001/3471
USPC ....... 454/322, 115, 162, 166, 347, 358, 333; 137/353
IPC ...................................................... B60H 1/34
See application file for complete search history.

(56) References Cited

U.S. PATENT DOCUMENTS

| 511,296 A | * | 12/1893 | Ewald | F24F 13/1426 454/322 |
|---|---|---|---|---|
| 3,034,531 A | * | 5/1962 | Kennedy | F24F 13/10 137/601.04 |
| 5,338,252 A | * | 8/1994 | Bowler | B60H 1/3421 454/155 |
| 6,582,293 B1 | * | 6/2003 | Siniarski | B60H 1/3414 454/155 |
| 2004/0127153 A1 | * | 7/2004 | Demerath | B60H 1/3421 454/155 |
| 2005/0042982 A1 | * | 2/2005 | Okada | B60H 1/3421 454/284 |
| 2005/0176364 A1 | * | 8/2005 | Gehring | B60H 1/3414 454/155 |
| 2005/0239391 A1 | * | 10/2005 | Shibata | B60H 1/3421 454/155 |

(Continued)

FOREIGN PATENT DOCUMENTS

| EP | 2602137 A2 | 6/2013 | |
| FR | 2760694 A1 | * 9/1998 | ............. B60H 1/345 |

(Continued)

*Primary Examiner* — Gregory Huson
*Assistant Examiner* — Daniel E Namay
(74) *Attorney, Agent, or Firm* — Posz Law Group, PLC

(57) ABSTRACT

Each fin shaft of auxiliary fins passes through each of upper and lower bearing parts in a first wall part. A pair of transmission shafts provided for the upper and lower fin shafts is arranged outside of the first wall part. A cam member is rotationally arranged outside of the first wall part. A fin shaft of a main fin is rotationally supported by the first wall part. The fin shaft of the main fin has an arm and a transmission shaft. The cam member has cam holes in which the transmission shafts of the upper auxiliary fin are fitted, cam holes in which the transmission shafts of the lower auxiliary fin are fitted, and a long hole in which the transmission shaft of the fin shaft of the main fin is fitted.

5 Claims, 13 Drawing Sheets

(56) References Cited

U.S. PATENT DOCUMENTS

| | | | | |
|---|---|---|---|---|
| 2006/0057952 A1* | 3/2006 | Kim | ................ | B60H 1/3428 |
| | | | | 454/155 |
| 2010/0120347 A1* | 5/2010 | Gehring | ................ | B60H 1/345 |
| | | | | 454/155 |
| 2015/0065031 A1* | 3/2015 | Shibata | ................ | B60H 1/3421 |
| | | | | 454/322 |

FOREIGN PATENT DOCUMENTS

| JP | 60243441 | A | * | 12/1985 |
| JP | 01163551 | A | * | 6/1989 |
| JP | 11180140 | A | * | 7/1999 |
| JP | 2004268711 | A | * | 9/2004 |
| JP | 2012030718 | A | * | 2/2012 |
| JP | 2012254662 | A | * | 12/2012 |
| JP | 2013226876 | A | * | 11/2013 |

* cited by examiner

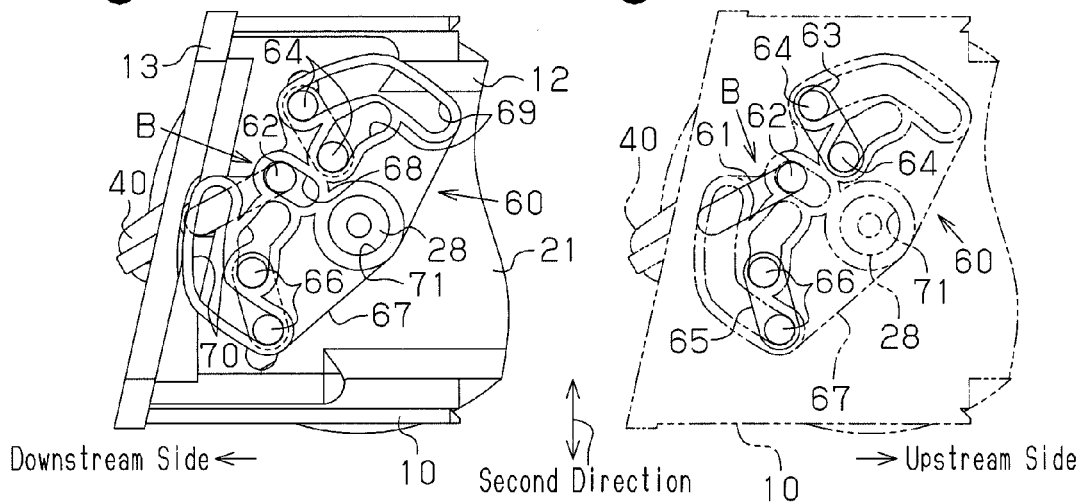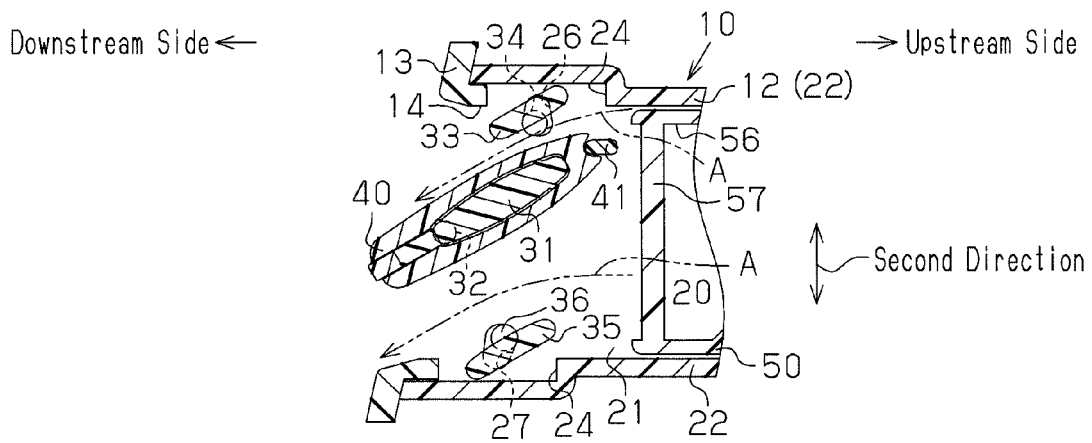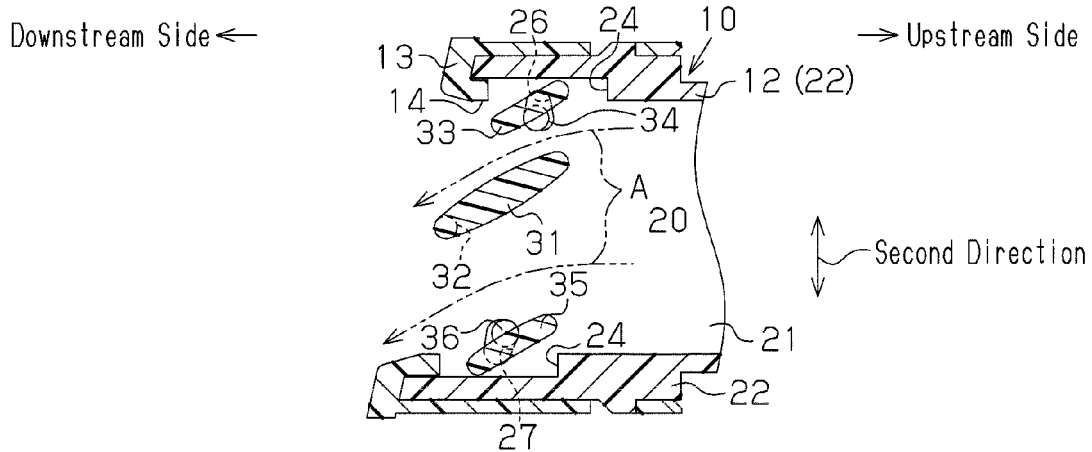

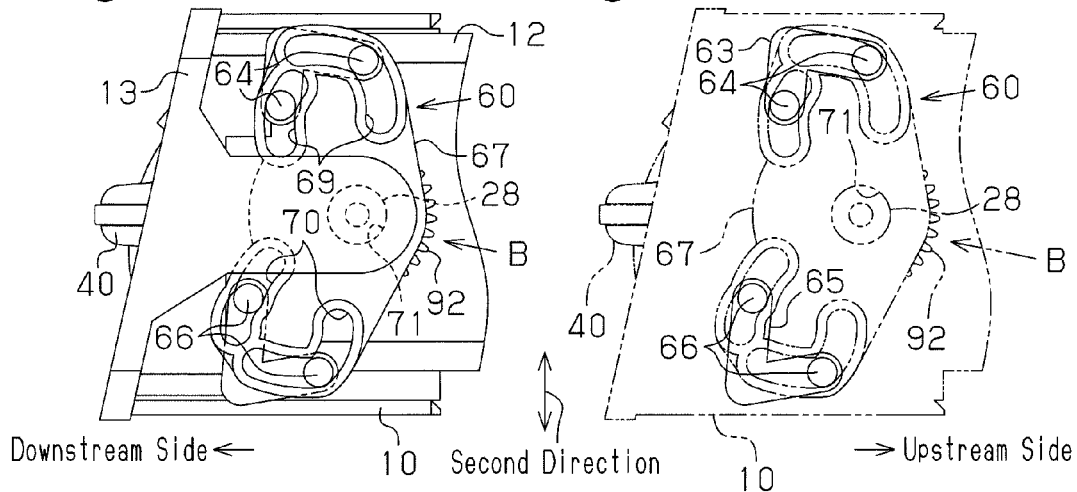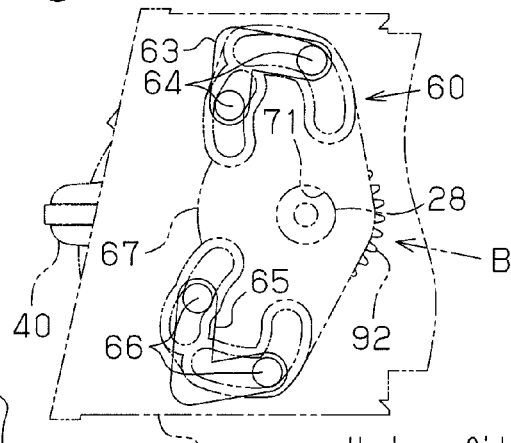
Fig.21A  Fig.21B
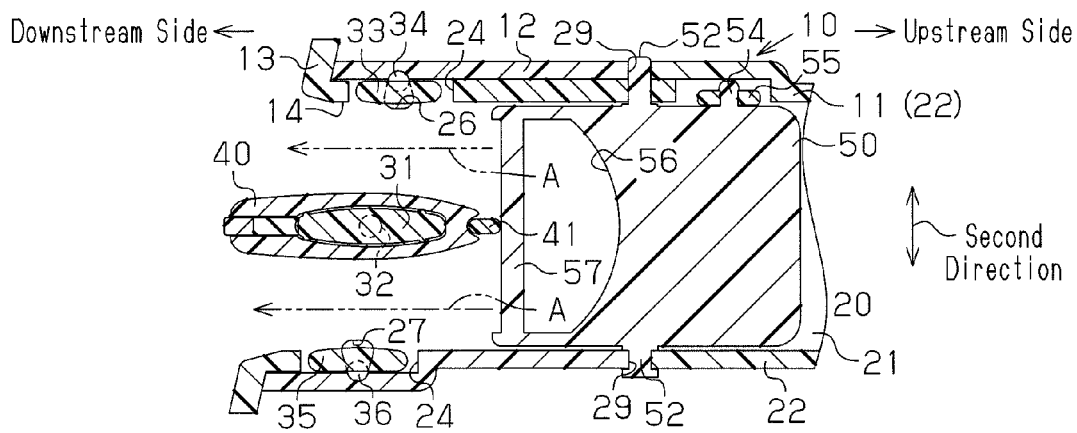
Fig.22
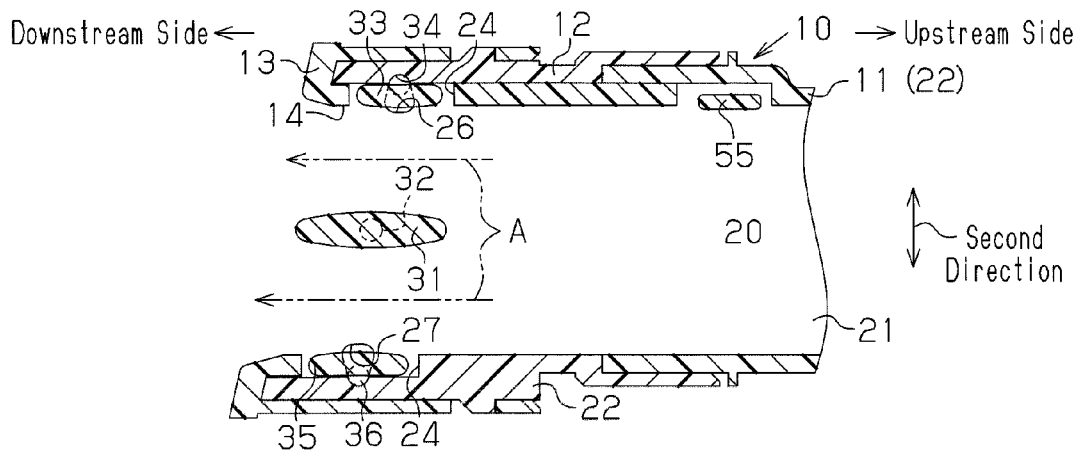
Fig.23

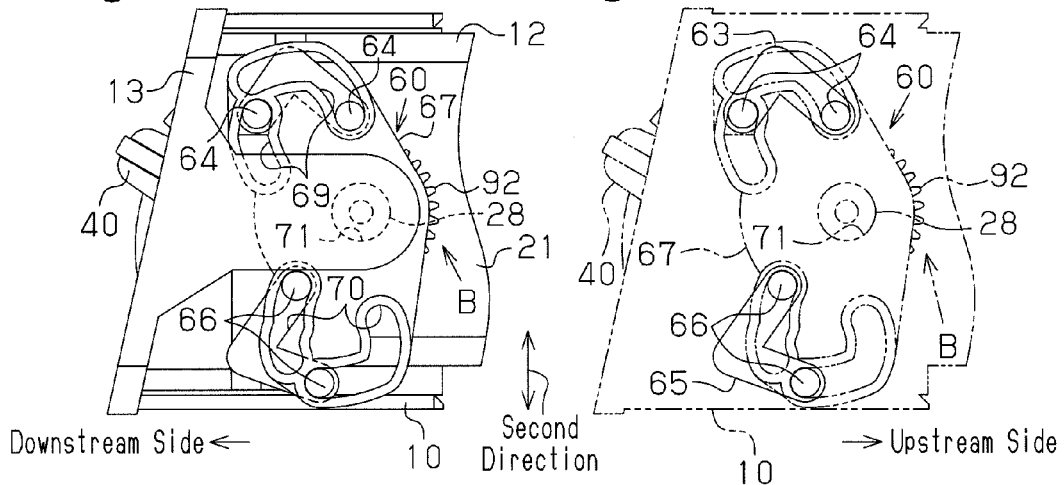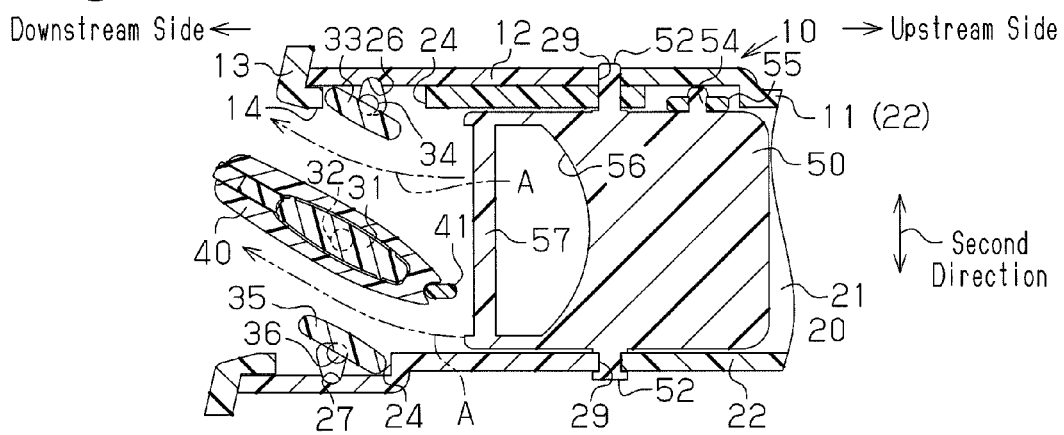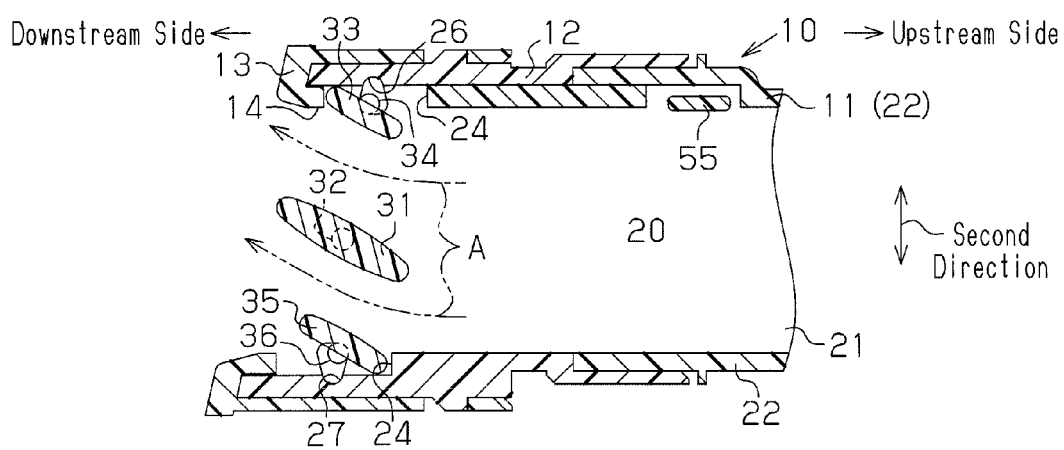

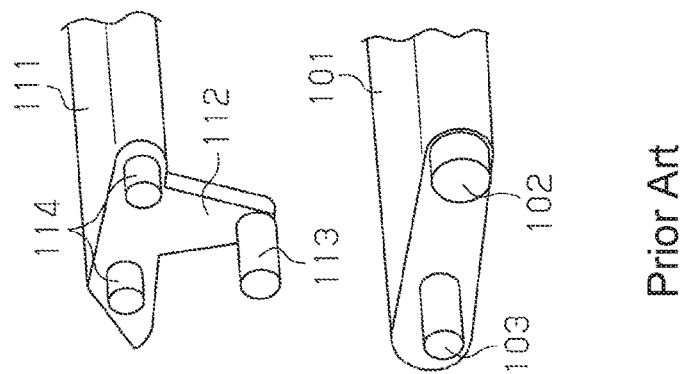
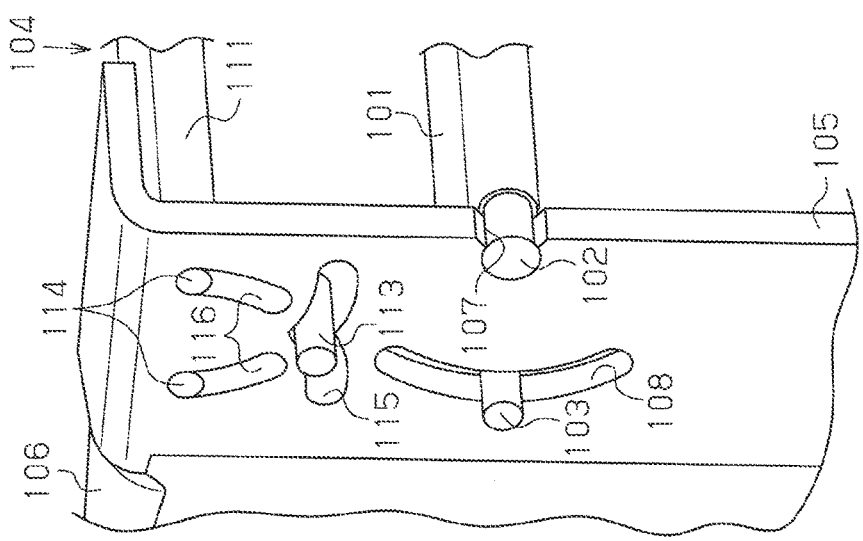
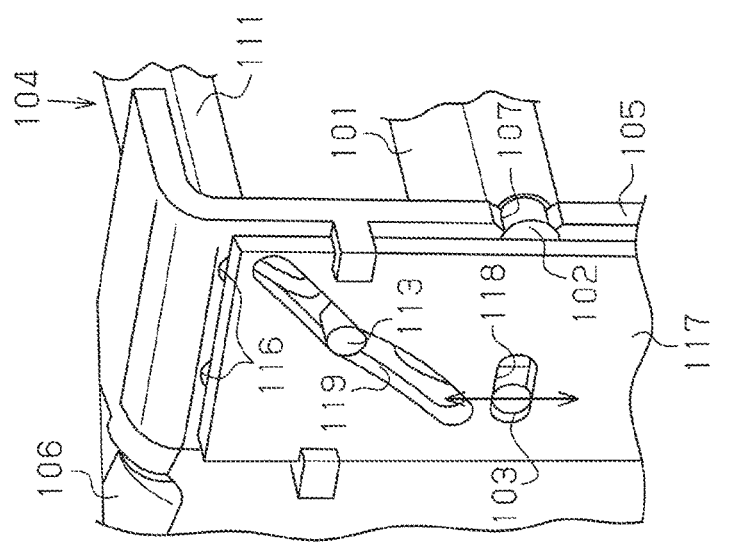

REGISTER FOR AIR CONDITIONING

This application claims priority of Japanese Patent application No. 2013-177330.

BACKGROUND OF THE INVENTION

This invention relates to a register for air conditioning that changes the direction of air blowing out of an air conditioner into a room with a fin.

A register for air conditioning is incorporated in an instrument panel of a vehicle. The register for air conditioning changes the direction of air blowing out of an air conditioner into a vehicle cabin. Incorporating the register for air conditioning into the instrument panel requires reserve of space of a different unit to be installed on the instrument panel. In response, there has been suggested a thin register for air conditioning having a dimension in the crosswise direction larger than a dimension in the longitudinal direction.

The register for air conditioning includes a rectangular cylindrical case having a small dimension in the height direction, and multiple fins arranged in the case. The fins are arranged parallel to each other in the vertical direction. The fins include a pair of auxiliary fins and a main fin. The main fin is arranged between the auxiliary fins. Fin shafts project from opposite end surfaces of each of the auxiliary fins and the main fin. The auxiliary fins and the main fin are rotationally supported by right and left wall parts of the case through the corresponding fin shafts.

In the register for air conditioning, in order to improve the directivity of air blowing out of a supply opening, it is desirable that the auxiliary fins rotate substantially parallel to the main fin in an interlocked relationship with rotation of the main fin. Further, in order to reserve flow paths of air between the main fin and the auxiliary fins, it is desirable that each of the auxiliary fins rotate near upper and lower wall parts of the case.

Thus, there has been suggested a register for air conditioning that rotates each of the auxiliary fins substantially parallel to the main fin while moving at least one of an upstream end and a downstream end of each of the auxiliary fins toward the upper or lower wall part of the case. In such a register for air conditioning, while the main fin is substantially parallel to the upper and lower wall parts of the case, each of the auxiliary fins is arranged substantially parallel to the upper and lower wall parts of the case while the upstream and downstream ends of each of the auxiliary fins are arranged near the upper or lower wall part of the case.

If the main fin is tilted such that a downstream end of the main fin is arranged in a higher position, the upper auxiliary fin rotates downward with a downstream end of the upper auxiliary fin moving toward the upper wall part of the case while the lower auxiliary fin rotates upward with an upstream end of the lower auxiliary fin moving toward the lower wall part of the case. Conversely, if the main fin is tilted such that the downstream end of the main fin is arranged in a lower position, the upper auxiliary fin rotates downward with an upstream end of the upper auxiliary fin moving toward the upper wall part of the case while the lower auxiliary fin rotates upward with a downstream end of the lower auxiliary fin moving toward the lower wall part of the case.

A mechanism to actuate the main fin and the auxiliary fins in the aforementioned manner is described for example in European Patent Application Publication No. 2602137. As shown in FIGS. 30A to 30C, in the structure disclosed in this publication, a fin shaft 102 and a transmission shaft 103 project from an end surface of a main fin 101. A bearing part 107 and a long hole 108 penetrate through each of right and left wall parts 105 of a case 104. The long hole 108 extends along a circular arc about the bearing part 107 as a center. The fin shaft 102 is rotationally supported by the bearing part 107. The transmission shaft 103 passes through the long hole 108 such that it can move along the long hole 108.

An auxiliary fin 111 has an end portion provided with an arm 112. A fin shaft 113 projects from the arm 112. A pair of shafts 114 projects from an end surface of the auxiliary fin 111. One bearing part 115 and a pair of cam holes 116 are formed above the long hole 108 in each of the right and left wall parts 105 of the case 104. One bearing part and a pair of cam holes, not shown in the drawings, are further formed below the long hole 108 in each of the right and left wall parts 105. The fin shaft 113 passes through the bearing part 115 in a manner that allows displacement and rotation of the fin shaft 113. Each of the transmission shafts 114 passes through a corresponding one of the cam holes 116 in a manner that allows displacement of the transmission shaft 114.

A plate-like cam member 117 is arranged outside each of the right and left wall parts 105 such that it can move up and down. A long hole 118 and a cam hole 119 are formed in the cam member 117. The transmission shaft 103 passes through the long hole 118 in a manner that allows displacement of the transmission shaft 103. The fin shaft 113 passes through the cam hole 119 in a manner that allows displacement of the fin shaft 113.

In this structure, rotating the main fin 101 in the vertical direction about the fin shaft 102 rotates the transmission shaft 103 around the fin shaft 102. This movement of the transmission shaft 103 is transmitted through the wall surface of the long hole 118 to the cam member 117, thereby moving the cam member 117 up and down. This changes a place where the bearing part 115 and the cam hole 119 intersect, thereby changing the position of the fin shaft 113 in the bearing part 115. In response, each of the transmission shafts 114 moves in corresponding one of the cam holes 116. As a result, in response to the rotation of the main fin 101, each of the auxiliary fins 111 rotates while maintaining a condition substantially parallel to the main fin 101 with at least one of an upstream end and a downstream end of each of the auxiliary fins 111 moving toward an upper wall part 106 or a lower wall part 106 of the case 104. This improves the directivity of air blowing out of a supply opening while reserving a flow path of air between the main fin 101 and the auxiliary fin 111.

In the aforementioned register for air conditioning, while the cam member 117 is moved up and down to rotate the auxiliary fin 111, the cam member 117 sticks upward from the upper wall part 106 of the case 104 or downward from the lower wall part 106 of the case 104. This may causes the fear of interference between the cam member 117 and a part around the case 104. Additionally, each of the right and left wall parts 105 of the case 104 is provided with the long hole 108, the bearing part 115, and the cam hole 116. These holes become the cause for a poor visual quality as they are recognized visually when the inside of the case 104 is viewed.

SUMMARY OF THE INVENTION

It is an object of this invention to provide a register for air conditioning that suppresses interference between a cam member and a part around a case while enhancing the visual quality of a wall part of the case.

In order to achieve this object, a first aspect of this invention provides a register for air conditioning comprising: a cylindrical case formed of two first wall parts, which are opposite each other in a first direction, and two second wall parts, which are opposite each other in a second direction that is substantially orthogonal to the first direction. The case has a dimension in the first direction that is larger than a dimension in the second direction. A pair of auxiliary fins is arranged in the case near corresponding ones of the second wall parts. The auxiliary fins extend in the first direction and rotate in the second direction about corresponding fin shafts. A main fin is arranged between the auxiliary fins and is supported by each of the first wall parts through a fin shaft. The main fin extends in the first direction and rotates in the second direction. An interlock mechanism rotates each of the auxiliary fins while moving at least one of an upstream end and a downstream end of each of the auxiliary fins toward one of the second wall parts in response to rotation of the main fin. The interlock mechanism includes: a pair of bearing parts formed in the first wall parts near the second wall parts. The bearing parts permit the fin shafts of each of the auxiliary fins to pass therethrough such that the fin shafts of each of the auxiliary fins become closer to and farther away from one of the second wall parts. A pair of transmission shafts is arranged outside of each of the first wall parts. The transmission shafts are coupled to each of the fin shafts passing through the bearing parts. A cam member is rotationally arranged outside of each of the first wall parts. The cam member has a fitting target in which each of the transmission shafts is fitted. The fitting target is formed of a groove part or a long hole. A transmission unit rotates the cam member by transmitting rotation of the main fin to the cam member.

BRIEF DESCRIPTION OF THE DRAWINGS

FIG. 16A is a partial right side view of the register for air conditioning where the main fin is tilted such that the downstream side of the main fin is arranged in a lower position.

FIG. 16B is a partial right side view showing relationships between the arms, the transmission shafts, and the parts around the arms and the transmission shafts.

FIGS. 17 and 18 are partial side sectional views of the register for air conditioning where the main fin is tilted such that the downstream side of the main fin is arranged in a lower position.

FIG. 21A is a partial right side view of the register for air conditioning.

FIG. 21B is a partial right side view showing relationships between arms, transmission shafts, and parts around the arms and the transmission shafts.

FIGS. 22 and 23 are partial side sectional views of the register for air conditioning where the main fin is arranged in a substantially horizontal posture.

FIG. 24A is a partial right side view of the register for air conditioning where the main fin is tilted such that a downstream side of the main fin is arranged in a higher position.

FIG. 24B is a partial right side view showing relationships between the arms, the transmission shafts, and the parts around the arms and the transmission shafts.

FIGS. 25 and 26 are partial side sectional views of the register for air conditioning where the main fin is tilted such that the downstream side of the main fin is arranged in a higher position.

FIG. 30A is a partial perspective view of a main fin and an auxiliary fin forming a conventional register for air conditioning.

FIG. 30B is a partial perspective view showing the main fin and the auxiliary fin supported by a case.

FIG. 30C is a partial perspective view showing a cam member attached to the case.

Figure 1:
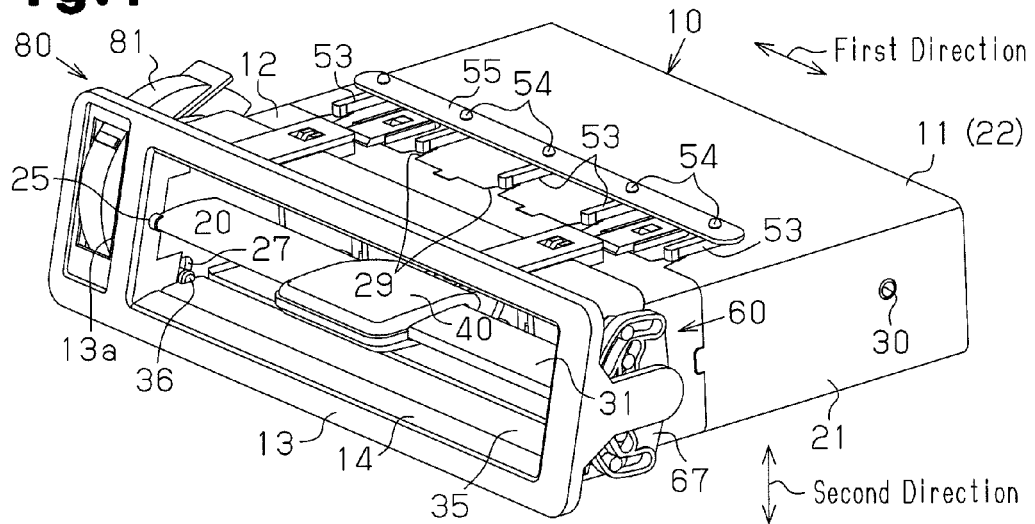
FIG. 1 is a perspective view showing a register for air conditioning according to a first embodiment of this invention.

DETAILED DESCRIPTION OF THE PREFERRED EMBODIMENTS (First Embodiment)

The following describes a first embodiment by referring to FIGS. 1 to 18 that embodies a register for air conditioning of this invention. While the register for air conditioning is described, a direction where a vehicle travels forward is defined as a forward direction, a direction where the vehicle travels backward is defined as a backward direction, and the height direction is defined as a vertical direction. Further, right and left directions correspond to directions defined when the vehicle is viewed from the back.

An instrument panel is arranged in front of a driver seat and a front passenger seat in a vehicle cabin. The register for air conditioning is attached, for example, to the center or to a lateral part of the instrument panel. The register for air conditioning adjusts the direction of air blowing out of an air conditioner into the vehicle cabin or block air blowing out of a supply opening.

As shown in FIGS. 1 and 4 to 6, the register for air conditioning includes a case 10, a downstream side fin group, an upstream side fin group, an operation knob 40, an interlock mechanism 60, a shut damper 75, and a damper drive mechanism 80. The case 10 is a part connecting a ventilating duct of the air conditioner and an opening of the instrument panel. The case 10 includes an upstream side retainer 11, a downstream side retainer 12, and a bezel 13. The case 10 is formed of a rectangular cylindrical body with opposite open ends. The case 10 has a dimension in the crosswise direction larger than a dimension in the longitudinal direction. Space inside the case 10 forms a flow path of air A for air conditioning. In the below, this flow path is called a ventilating path 20.

Two directions substantially orthogonal to each other in a plane orthogonal to a ventilating direction of the air A include a first direction and a second direction. In the first embodiment, the first direction corresponds to the direction of the width of a vehicle and the second direction corresponds to the vertical direction. The ventilating direction of the air A is a ventilating direction of air determined before the air is changed in direction by the downstream side and upstream side fin groups. A side facing the ventilating path 20 is called an inner side and a side opposite the ventilating path 20 is called an outer side.

The upstream side retainer 11 forms the most upstream side part of the case 10. The downstream side retainer 12 is arranged on a downstream side relative to the upstream side retainer 11. An upstream side end of the downstream side retainer 12 is coupled to a downstream side end of the upstream side retainer 11. The bezel 13 forms a design aspect of the register for air conditioning. The bezel 13 is arranged on the most downstream side of the case 10. The bezel 13 is coupled to the downstream side retainer 12 from a downstream side. The bezel 13 has a horizontally-long rectangular opening. The opening forms a downstream end of the ventilating path 20 that forms a supply opening 14 for the air A for air conditioning. A window part 13a is formed on a left side part of the bezel 13. The window part 13a is formed of a vertically-long rectangular hole.

The ventilating path 20 is surrounded by four wall parts of the case 10. The four wall parts include a pair of first wall parts 21 and a pair of second wall parts 22. The paired first wall parts 21 are substantially parallel and opposite each other in the first direction. The paired second wall parts 22 are substantially parallel and opposite each other in the second direction.

Figure 11:
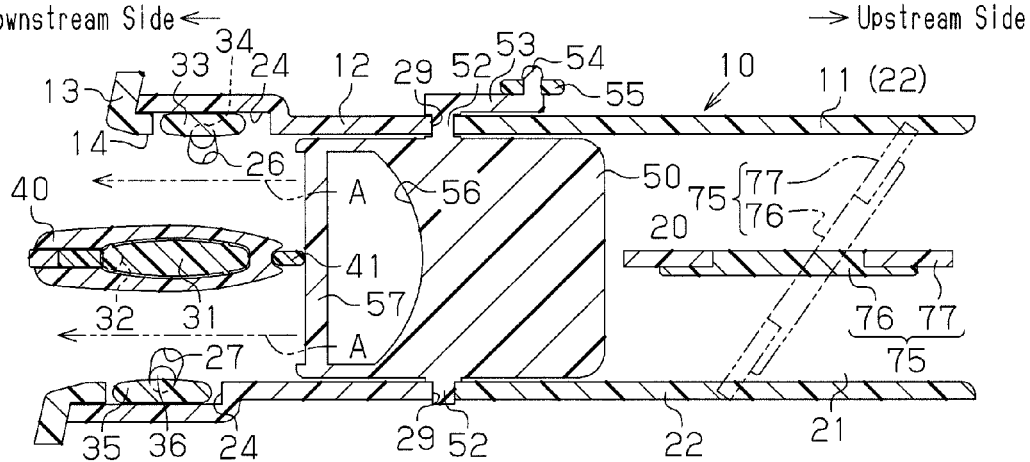
FIG. 11 is a sectional view taken along line 11-11 of FIG. 8.
Figure 12:
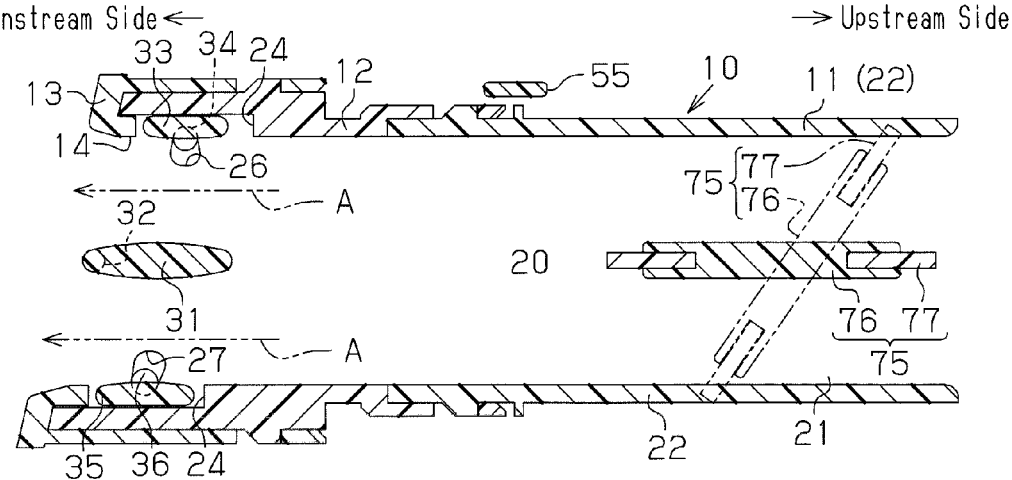
FIG. 12 is a sectional view taken along line 12-12 of FIG. 8.

As shown in FIGS. 11 and 12, housing recessed parts 24 are formed in the inner surfaces of corresponding ones of the second wall parts 22. The housing recessed parts 24 are formed so as to communicate with the ventilating path 20. The housing recessed parts 24 expand a gap in the vertical direction in a downstream area of the ventilating path 20.

Figure 2:
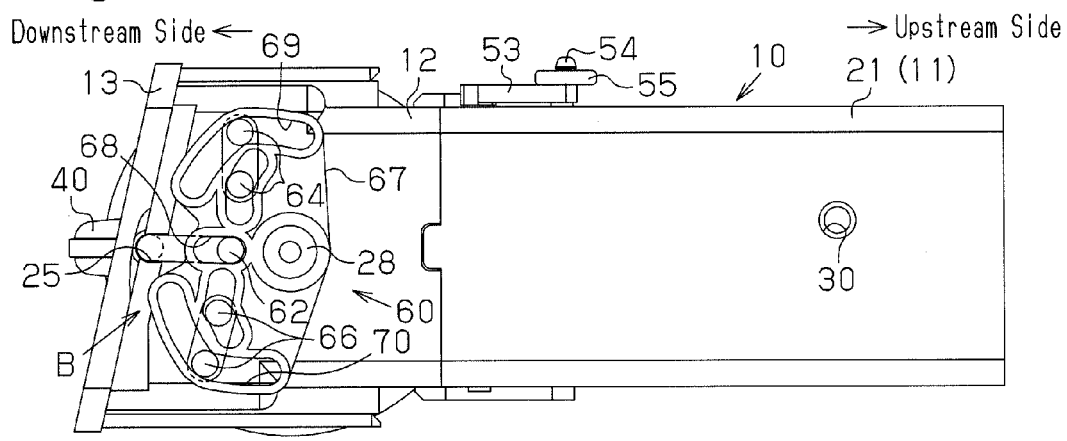
FIG. 2 is a right side view of the register for air conditioning.
Figures 13A, 13B:
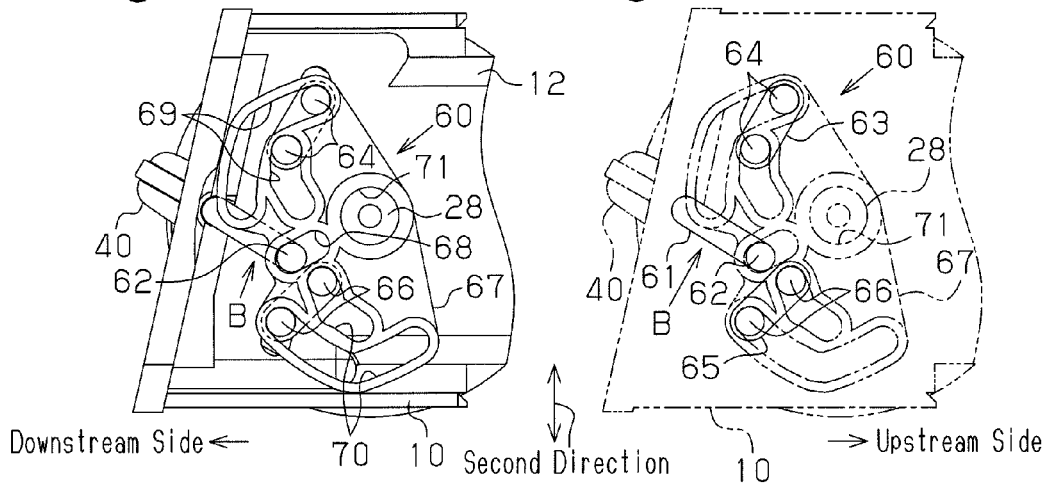
FIG. 13A is a partial right side view of the register for air conditioning where the main fin is tilted such that a downstream side of the main fin is arranged in a higher position.
FIG. 13B is a partial right side view showing relationships between the arms, the transmission shafts, and the parts around the arms and the transmission shafts.

As shown in FIGS. 1 and 2, the first wall parts 21 have respective bearing parts 25 formed in the center of the second direction. Each bearing part 25 is slightly spaced from the supply opening 14 toward an upstream side. Each bearing part 25 is formed in an area where the downstream side retainer 12 and the bezel 13 are coupled. In FIGS. 2, 13A and 16A, part of the bezel 13 is omitted.

Figure 5:
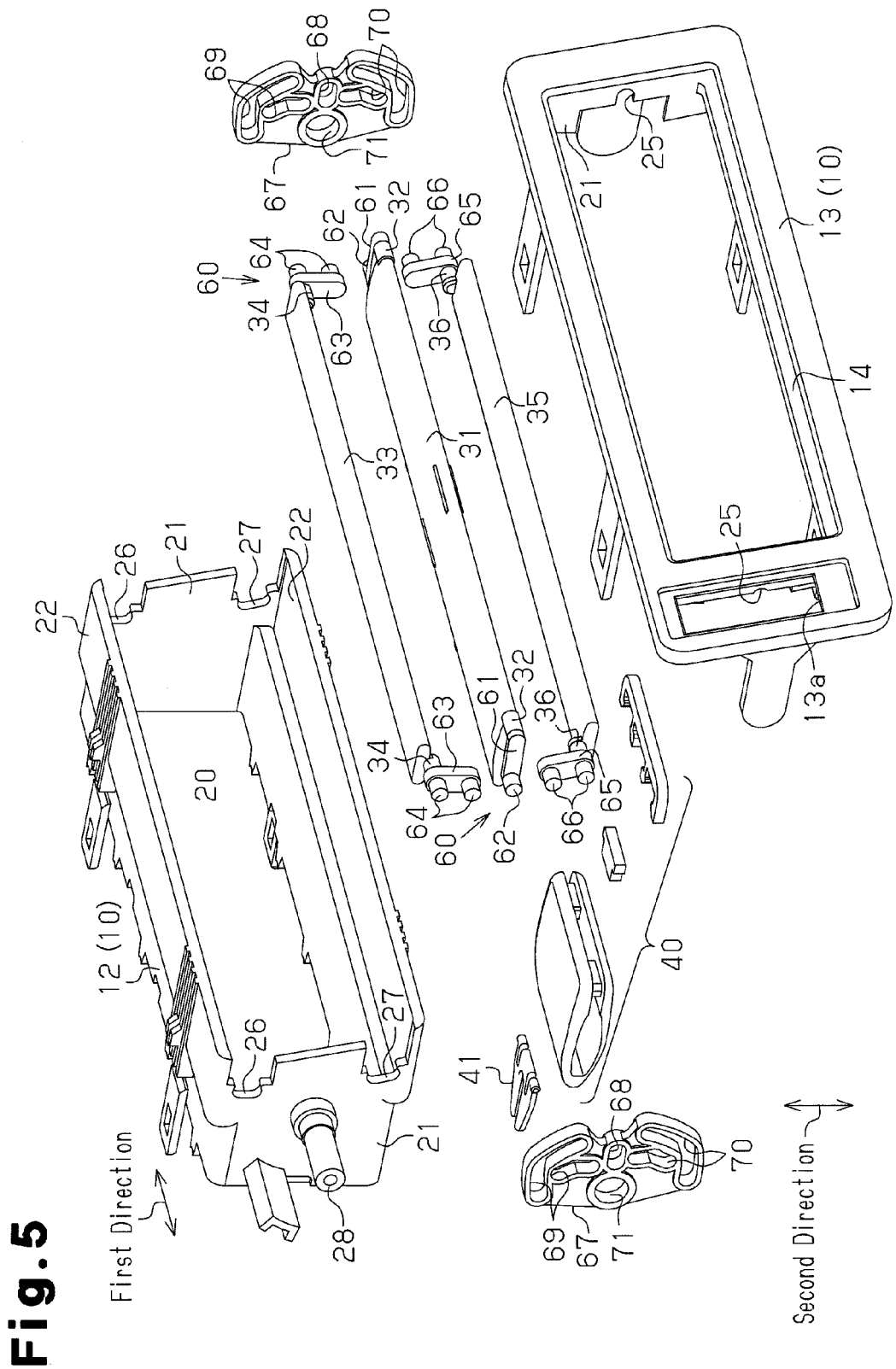

As shown in FIGS. 5 and 11, each of the first wall parts 21 has a bearing part 26 and a bearing part 27 formed in an area where the downstream side retainer 12 and the bezel 13 are coupled. The bearing parts 26 and 27 are formed in upper and lower portions respectively of the coupling area. The bearing parts 26 and 27 are formed in positions corresponding to the housing recessed part 24. The bearing parts 26 and 27 are near the second wall part 22. The bearing part 26 is longer in the vertical direction than a fin shaft 34 of an auxiliary fin 33. The bearing part 26 has an upper end portion slightly spaced downward from the upper second wall part 22. The bearing part 27 is longer in the vertical direction than a fin shaft 36 of an auxiliary fin 35. The bearing part 27 has a lower end portion slightly spaced upward from the lower second wall part 22.

Figure 4:
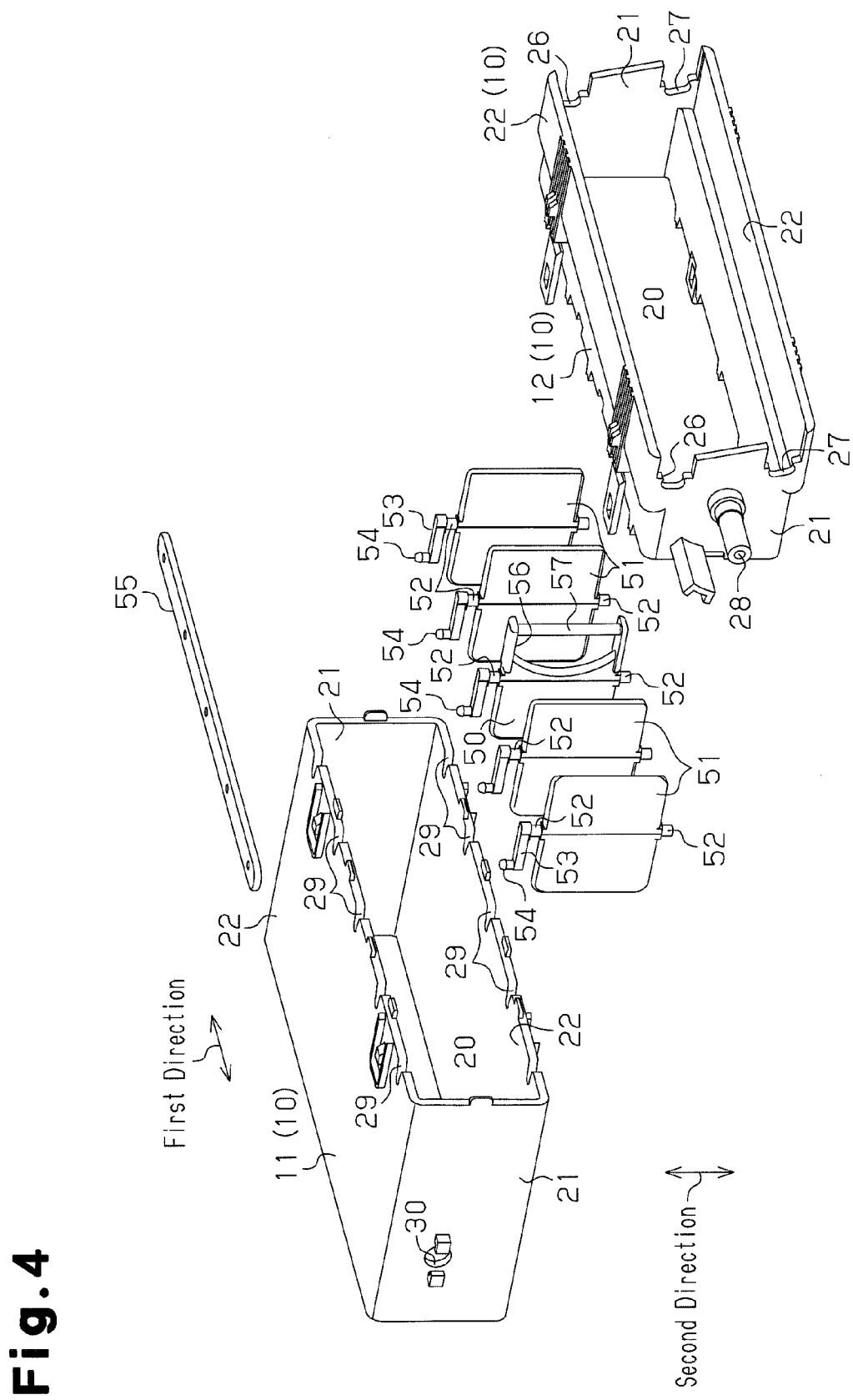
FIGS. 4, 5 and 6 are exploded perspective views each showing some of components forming the register for air conditioning.

As shown in FIGS. 4 and 5, support shafts 28 project outward from corresponding ones of the first wall parts 21. Each of the support shafts 28 is arranged on a slightly upstream side relative to the bearing parts 26 and 27. Each of the support shafts 28 is arranged in the center of the vertical direction of the first wall part 21. The left support shaft 28 is longer than the right support shaft 28. Each of the second wall parts 22 is provided with multiple bearing parts 29. The bearing parts 29 are formed in an area where the upstream side and downstream side retainers 11 and 12 are coupled. The bearing parts 29 are equally spaced in the first direction.

The first wall part 21 is provided with a bearing part 30 formed of a hole. The bearing part 30 is arranged on an upstream side relative to the support shaft 28 and in the center of the second direction. The first wall part 21 has the bearing parts 26 and 27 arranged around the bearing part 25 in which the main fin 31 is supported. The bearing parts 26 and 27 penetrate through the first wall part 21 in the first direction.

Figure 7:
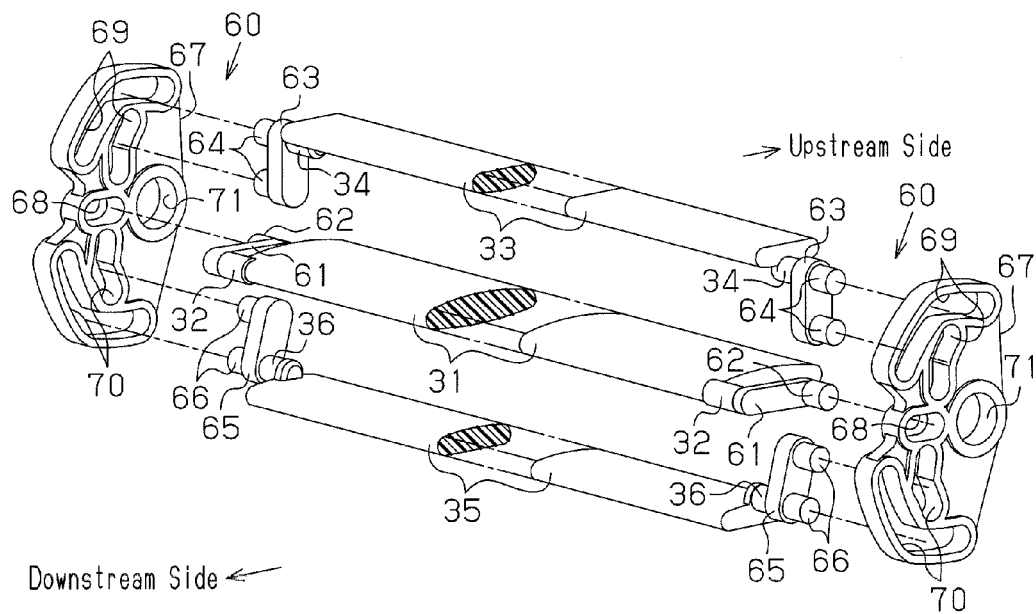
FIG. 7 is an exploded perspective view showing a main fin, auxiliary fins, and cam members of the register for air conditioning.
Figure 8:
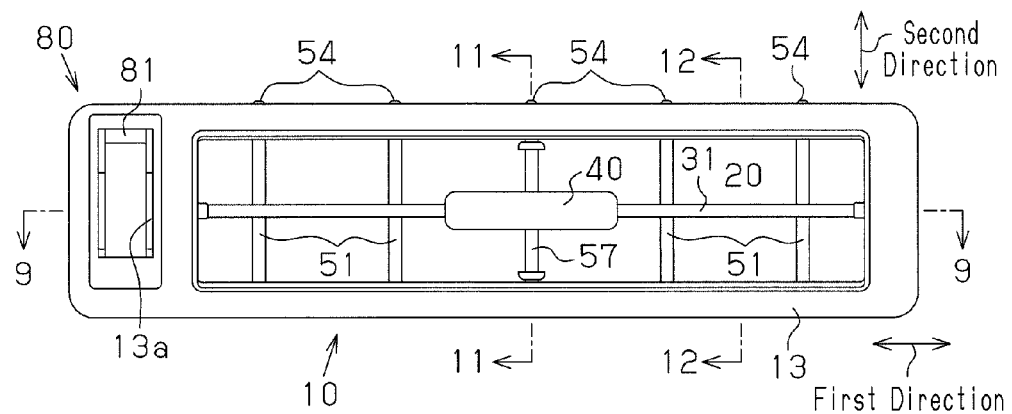
FIG. 8 is a front view of the register for air conditioning.

As shown in FIGS. 5 and 7, the downstream side fin group includes one main fin 31, an upper auxiliary fin 33, and a lower auxiliary fin 35 in a group. The main fin 31 and the auxiliary fins 33 and 35 are formed of horizontally-long plate-like bodies extending in the first direction. Fin shafts 32 project outward from opposite end surfaces of the main fin 31. Each of the fin shafts 32 is arranged at a downstream end of the main fin 31. The fin shafts 32 are supported by corresponding ones of the first wall parts 21 through the bearing parts 25 such that they can rotate in the second direction.

The upper auxiliary fin 33 is arranged directly below the upper second wall part 22. Fin shafts 34 project outward from opposite end surfaces of the auxiliary fin 33. The fin shaft 34 passes through the upper bearing part 26. In the auxiliary fin 33, each of the fin shafts 34 is arranged in the center of the ventilating direction. In the auxiliary fin 33, each of the fin shafts 34 is arranged below the center of the thickness direction. The upper auxiliary fin 33 can rotate in the second direction in the bearing part 26 about the fin shaft 34. The fin shaft 34 moves in the vertical direction to get closer to and away from the upper second wall part 22.

The lower auxiliary fin 35 is arranged directly above the lower second wall part 22. Fin shafts 36 project outward from opposite end surfaces of the auxiliary fin 35. The fin shaft 36 passes through the lower bearing part 27. In the auxiliary fin 35, each of the fin shafts 36 is arranged in the center of the ventilating direction. In the auxiliary fin 35, each of the fin shafts 36 is arranged above the center of the thickness direction. The lower auxiliary fin 35 can rotate in the second direction in the bearing part 27 about the fin shaft 36. The fin shaft 36 moves in the vertical direction to get closer to and away from the lower second wall part 22.

Each of the auxiliary fins 33 and 35 has a dimension in the ventilating direction smaller than that of the main fin 31. The downstream side fin group is formed of the three fins for the reason of reserving a flow path of the air A for air conditioning while reserving wide gaps between the fins in the ventilating path 20 having a small dimension in the height direction.

Figure 9:
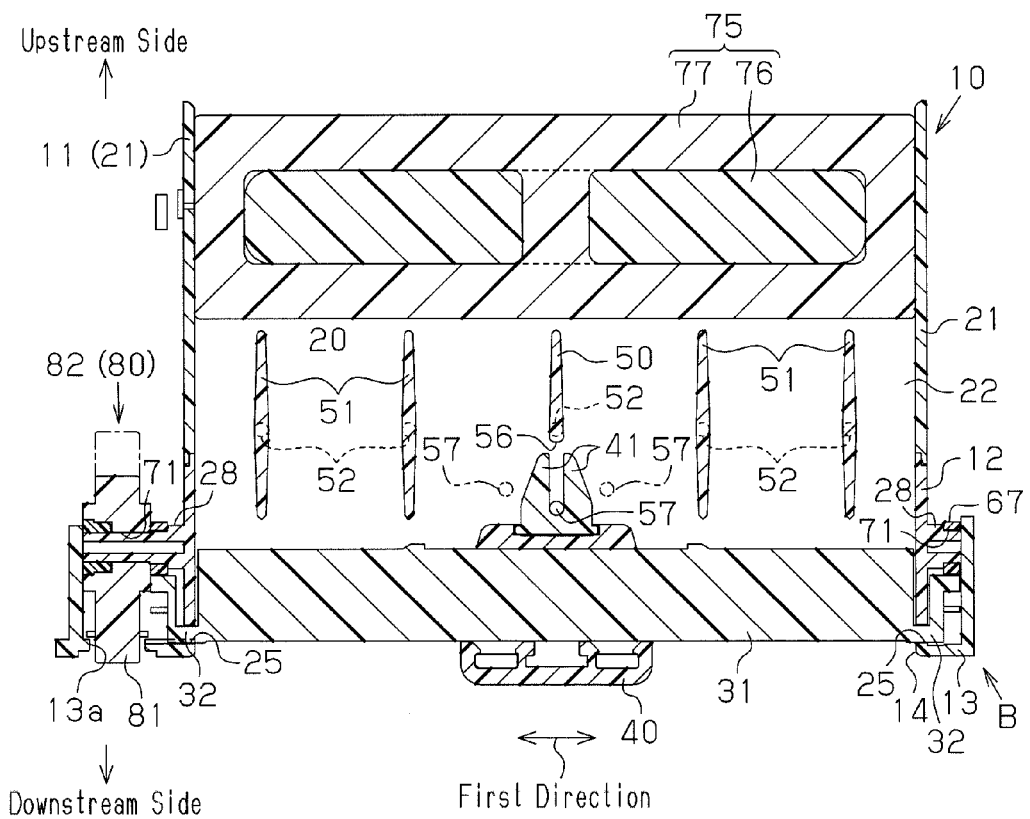
FIG. 9 is a sectional view taken along line 9-9 of FIG. 8.

As shown in FIGS. 1 and 9, the operation knob 40 is operated by a person in a vehicle when the direction of the air A blowing out of the supply opening 14 is to be adjusted. The operation knob 40 is attached to the main fin 31 such that it can make sliding movement in the first direction. The operation knob 40 can rotate in the second direction about the fin shaft 32 together with the main fin 31. A bifurcated fork part 41 is formed at an upstream end of the operation knob 40. The fork part 41 transmits movement of the operation knob 40 in the first direction to an upstream side fin 50. The fork part 41 is supported such that it can rotate relative to the operation knob 40. Accordingly, the fork part 41 can maintain a condition substantially parallel to the second wall part 22 irrespective of rotation of the operation knob 40 in the second direction.

As shown in FIGS. 4 and 9, the upstream side fin group is formed of multiple upstream side fins. The upstream side fins are arranged on an upstream side relative to the downstream side fin group in the ventilating path 20. The upstream side fin is formed of a plate-like body extending in the second direction. The upstream side fins are equally spaced and substantially parallel to each other in the first direction. The upstream side fins include the upstream side fin 50 arranged in the center of the first direction. The other upstream side fins are called upstream side fins 51.

Fin shafts 52 project outward from opposite end surfaces of the upstream side fin 50 and each of the upstream side fins 51. In the upstream side fin 50 and each of the upstream side fins 51, the fin shaft 52 is arranged in the center of the ventilating direction. The fin shafts 52 are supported by corresponding ones of the second wall parts 22 through the bearing parts 29 such that they can rotate in the first direction.

As shown in FIGS. 4 and 11, an upper end of each of the upper fin shafts 52 projects from the upper second wall part 22. An elongated arm 53 orthogonal to the fin shaft 52 is formed at the upper end of the fin shaft 52. A coupling shaft 54 projects upward from an upstream end of each arm 53. The respective coupling shafts 54 of the upstream side fins 50 and 51 are coupled by a coupling rod 55 outside the case 10. The coupling rod 55 is formed of an elongated member extending in the first direction. Parts including the upstream side fins 50 and 51, the fin shaft 52, the arm 53, the coupling shaft 54 and the coupling rod 55 form a parallel link mechanism. The parallel link mechanism rotates all the upstream side fins 51 in synchronous with the upstream side fin 50.

A passage hole part 56 is formed in a place near a downstream end of the upstream side fin 50. The upstream side fin 50 has a transmission shaft part 57 extending in the second direction arranged on a downstream side relative to the passage hole part 56. As shown in FIGS. 9 and 11, the transmission shaft part 57 is gripped by the fork part 41 of the operation knob 40. If the operation knob 40 makes sliding movement in the first direction relative to the main fin 31, this movement of the operation knob 40 is transmitted through the fork part 41 and the transmission shaft part 57 to the upstream side fin 50. This rotates the upstream side fin 50 in the first direction about the upper and lower fin shafts 52. The passage hole part 56 prevents interference with the fork part 41 to be caused by the rotation of the upstream side fin 50 in the first direction. The passage hole part 56 is not provided to the upstream side fins 51.

The interlock mechanism 60 rotates each of the upper and lower auxiliary fins 33 and 35 in the following three modes in response to rotation of the main fin 31.

Figure 10:
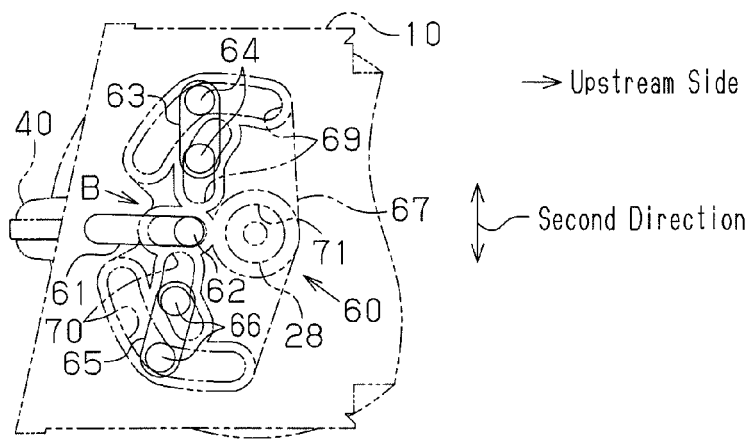
FIG. 10 is a partial right side view showing relationships between arms, transmission shafts, and parts around the arms and the transmission shafts.

(i) As shown in FIGS. 10 to 12, if the main fin 31 is substantially parallel to the second wall part 22, the auxiliary fins 33 and 35 are substantially parallel to the second wall part 22 while an upstream end and a downstream end of each of the auxiliary fins 33 and 35 are arranged near the second wall part 22.

Figure 14:
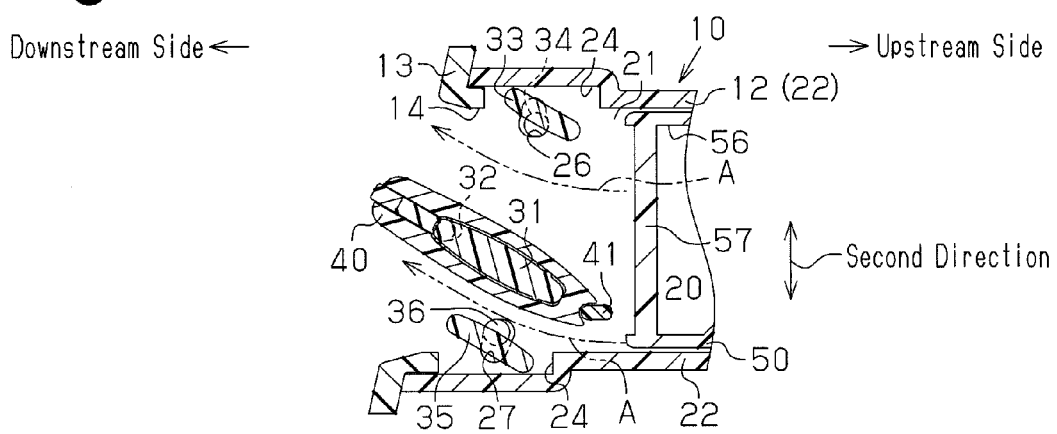
FIGS. 14 and 15 are partial side sectional views of the register for air conditioning where the main fin is tilted such that the downstream side of the main fin is arranged in a higher position.
Figure 15:
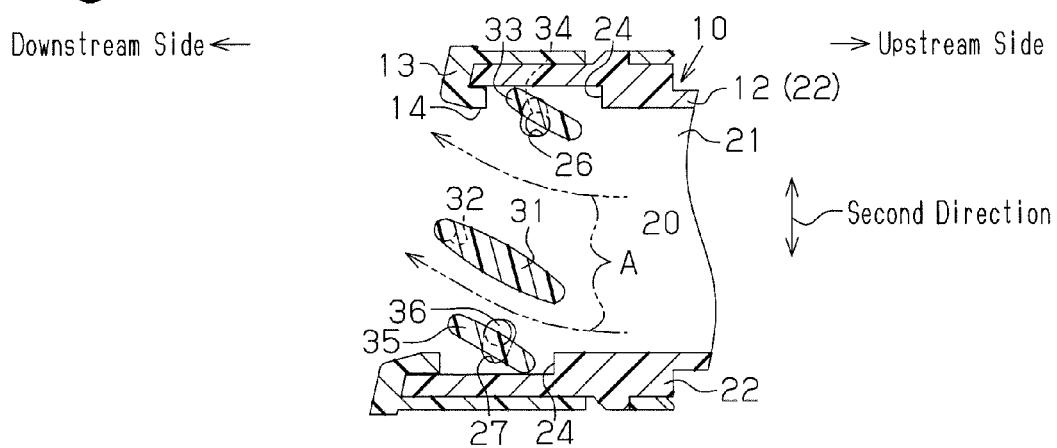

(ii) As shown in FIGS. 13 to 15, if the main fin 31 is tilted such that a downstream side of the main fin 31 is arranged in a higher position, the upper auxiliary fin 33 rotates downward with a downstream end of the auxiliary fin 33 moving toward the upper second wall part 22 while the lower auxiliary fin 35 rotates upward with an upstream end of the auxiliary fin 35 moving toward the lower second wall part 22.

(iii) As shown in FIGS. 16 and 18, if the main fin 31 is tilted such that the downstream side of the main fin 31 is arranged in a lower position, the upper auxiliary fin 33 rotates downward with an upstream end of the auxiliary fin 33 moving toward the upper second wall part 22 while the lower auxiliary fin 35 rotates upward with a downstream end of the auxiliary fin 35 moving toward the lower second wall part 22.

In this way, in response to the rotation of the main fin 31, the interlock mechanism 60 rotates the auxiliary fins 33 and 35 substantially parallel to the main fin 31 while moving at least one of the upstream and downstream ends of each of the auxiliary fins 33 and 35 toward the second wall part 22.

As shown in FIGS. 5 and 9, each of the fin shafts 32 of the main fin 31 projects outward from the first wall part 21. An elongated arm 61 is formed at an external end of the fin shaft 32. The arm 61 extends from the downstream end toward the upstream end of the main fin 31 in a direction orthogonal to the fin shaft 32. A transmission shaft 62 projects outward from an upstream end of each of the arms 61.

As shown in FIGS. 5, 10 and 11, each of the fin shafts 34 of the upper auxiliary fin 33 passes through the upper bearing part 26 to project to the outside of the first wall part 21. An elongated arm 63 is formed at an external end of each of the fin shafts 34. The arm 63 extends downward in a direction orthogonal to the fin shaft 34. A pair of transmission shafts 64 projects outward from the arm 63. One of the transmission shafts 64 in the pair is arranged coaxially with the fin shaft 34.

Each of the fin shafts 36 of the lower auxiliary fin 35 passes through the lower bearing part 27 to project to the outside of the first wall part 21. An elongated arm 65 is formed at an external end of each of the fin shafts 36. The arm 65 extends upward in a direction orthogonal to the fin shaft 36. A pair of transmission shafts 66 projects outward from the arm 65. One of the pair of transmission shafts 66 is arranged coaxially with the fin shaft 36.

A plate-like cam member 67 is arranged outside of the first wall part 21. The cam member 67 is rotationally supported by the first wall part 21 through the support shaft 28. A shaft hole 71 is formed in the center of the cam member 67. The cam member 67 is rotationally attached to the support shaft 28 passing through the shaft hole 71. The cam member 67 has a size that allows rotation of the cam member 67 in a region between the second wall parts 22. The cam member 67 has a long hole 68 formed as a transmission fitting target on a downstream side relative to the support shaft 28. In the cam member 67, the long hole 68 is arranged in the center of the second direction. If the main fin 31 is substantially parallel to the second wall part 22, the long hole 68 is substantially parallel to the second wall part 22.

Each of the cam members 67 has a pair of cam holes 69 formed as fitting targets above the support shaft 28 and the long hole 68. Each of the cam members 67 has a pair of cam holes 70 formed as fitting targets below the support shaft 28 and the long hole 68.

The transmission shaft 62 of the main fin 31 is fitted such that it can move inside the long hole 68 relative to the cam hole 70. If the main fin 31 is substantially parallel to the second wall part 22, the transmission shaft 62 moves to an upstream end of the long hole 68 arranged substantially parallel to the second wall part 22. As shown in FIGS. 13A and 16A, if the main fin 31 is tilted relative to the second wall part 22, the transmission shaft 62 moves to a downstream end or its vicinity of the long hole 68. The long hole 68, the arm 61, and the transmission shaft 62 form a transmission unit B to rotate the cam member 67 by transmitting rotation of the main fin 31 to the cam member 67.

The two transmission shafts 64 of the upper auxiliary fin 33 are fitted to the cam member 67 such that they can move inside corresponding ones of the cam holes 69. The two transmission shafts 66 of the lower auxiliary fin 35 are fitted to the cam member 67 such that they can move inside corresponding ones of the cam holes 70. The fits of the transmission shafts 64 and 66 into the cam holes 69 and 70 respectively satisfy the following conditions.

(a) As shown in FIGS. 10 and 11, if the main fin 31 is substantially parallel to the second wall part 22, each of the transmission shafts 64 is arranged in the center of corresponding one of the cam holes 69. Each of the transmission shafts 66 is arranged in the center of corresponding one of the cam holes 70. The arrangements of the transmission shafts 64 and 66 in these positions arrange the auxiliary fins 33 and 35 substantially parallel to the second wall part 22.

(b) As in FIGS. 13A, 13B and 14, if the main fin 31 is tilted such that the downstream side of the main fin 31 is arranged in a higher position, the upper transmission shafts 64 are arranged at respective upstream ends of corresponding ones of the cam holes 69 whereas the lower transmission shafts 66 are arranged at respective downstream ends of corresponding ones of the cam holes 70. The arrangements of the transmission shafts 64 and 66 in these positions tilt the auxiliary fins 33 and 35 such that their downstream sides are arranged in higher positions. Specifically, the auxiliary fins 33 and 35 are arranged substantially parallel to the main fin 31.

(c) As in FIGS. 16A, 16B and 17, if the main fin 31 is tilted such that its downstream side is arranged in a lower position, the upper transmission shafts 64 are arranged at respective downstream ends of corresponding ones of the cam holes 69 whereas the lower transmission shafts 66 are arranged at respective upstream ends of corresponding ones of the cam holes 70. The arrangements of the transmission shafts 64 and 66 in these positions tilt the auxiliary fins 33 and 35 such that their downstream sides are arranged in lower positions. Specifically, the auxiliary fins 33 and 35 are arranged substantially parallel to the main fin 31.

Figure 6:
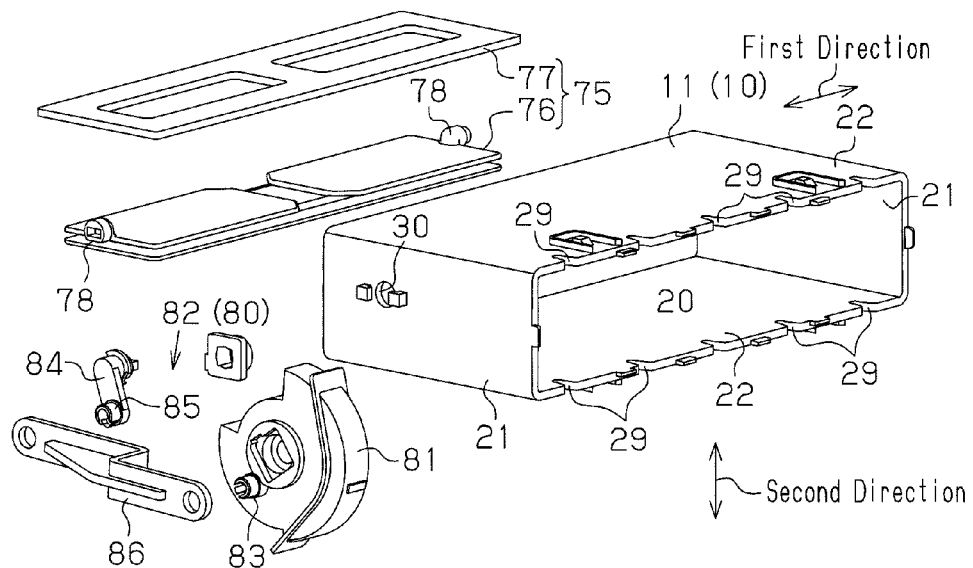

As shown in FIGS. 6 and 9, the shut damper 75 opens and closes the ventilating path 20 on an upstream side relative to the upstream side fin group in the case 10. The shut damper 75 is arranged in a plane orthogonal to the ventilating path 20. The shut damper 75 includes a body part 76 and a seal part 77 attached around the body part 76. The body part 76 is formed of a rectangular plate longer in the first direction than in the second direction.

Shafts 78 project from opposite end surfaces of the body part 76. The shut damper 75 is supported by the bearing parts 30 of the first wall parts 21 through the shafts 78. The shut damper 75 can be shifted between an open position and a close position by rotating in the second direction. As shown by solid lines of FIGS. 11 and 12, the shut damper 75 in the open position is arranged in the center between the second wall parts 22 and substantially parallel to the second wall part 22, thereby opening the ventilating path 20 largely. As shown by alternate long and two short dashed lines of FIGS. 11 and 12, the shut damper 75 in the close position is tilted relative to the second wall parts 22 to make the seal part 77 contact the inner wall surfaces of the first and second wall parts 21 and 22, thereby closing the ventilating path 20.

Figure 3:
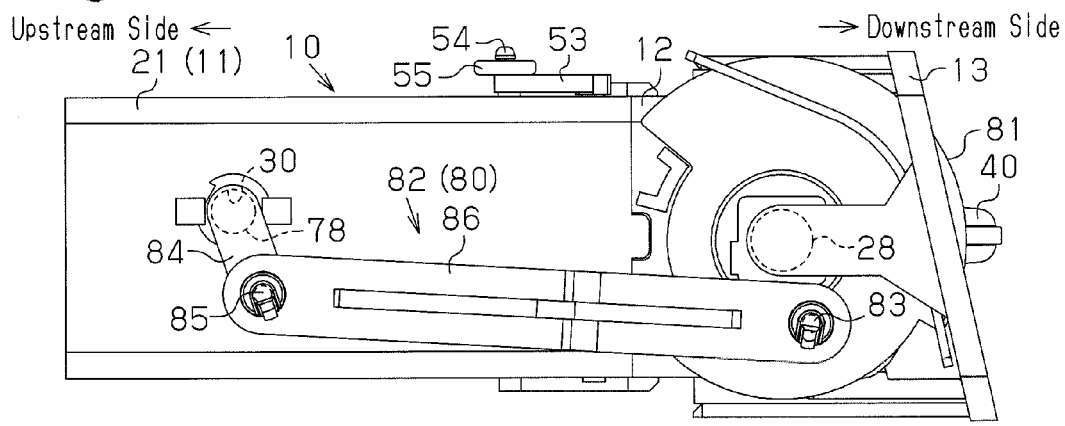
FIG. 3 is a left side view of the register for air conditioning.

As shown in FIGS. 3 and 6, the damper drive mechanism 80 rotates the shut damper 75 to open and close the ventilating path 20. The damper drive mechanism 80 includes an operation dial 81 and a rotation transmission part 82. The operation dial 81 is supported by the case 10 such that it can rotate in the second direction. Part of the operation dial 81 is exposed from the window part 13a of the bezel 13.

The rotation transmission part 82 transmits rotation of the operation dial 81 to the shut damper 75. The rotation transmission part 82 is arranged outside of the left first wall part 21, and couples the operation dial 81 and the shaft 78 of the shut damper 75.

The rotation transmission part 82 is formed of a link mechanism and a gear mechanism. Here, a pin 83 projecting outward is formed on a side surface of the operation dial 81. A lever 84 is fixed to the shaft 78 of the shut damper 75. A pin 85 projecting outward is formed at a tip portion of the lever 84. The pins 83 and 85 are coupled to each other through a link member 86.

The action of the register for air conditioning is described next.

The alternate long and two short dashed lines of FIGS. 11 and 12 show the shut damper 75 in the close position. In this case, the ventilating path 20 is closed by the shut damper 75. This blocks flow of the air A for air conditioning in the ventilating path 20, thereby stopping blowout of the air A through the supply opening 14.

The solid lines of FIGS. 11 and 12 show the shut damper 75 in the open position. In this case, the ventilating path 20 is fully opened so that the flow of the air A is divided into a flow above the shut damper 75 and a flow below the shut damper 75. The air A after passing through the shut damper 75 passes through the upstream side fin group and the downstream side fin group, and then blows out of the supply opening 14. If the operation dial 81 is rotated, the rotation of the operation dial 81 is transmitted through the damper drive mechanism 80 to the shut damper 75. This rotates the shut damper 75 to be switched to the close or open position.

The following description is based on the condition that the shut damper 75 is in the open position. FIGS. 11 and 12 show the register for air conditioning with the main fin 31 substantially parallel to the second wall part 22. In this case, as shown in FIGS. 2 and 10, the transmission shaft 62 moves to the upstream end of the long hole 68 arranged substantially parallel to the second wall part 22. Each of the transmission shafts 64 of the upper auxiliary fin 33 is arranged in the center of corresponding one of the cam holes 69. In this condition, the arm 63 is arranged to face in a substantially plumb direction. As shown in FIGS. 11 and 12, the upper auxiliary fin 33 is arranged substantially parallel to the second wall part 22 and is housed in the upper housing recessed part 24. As shown in FIGS. 2 and 10, each of the transmission shafts 66 of the lower auxiliary fin 35 is arranged in the center of corresponding one of the cam holes 70. In this condition, the arm 65 is also arranged to face in the substantially plumb direction. As shown in FIGS. 11 and 12, the lower auxiliary fin 35 is arranged substantially parallel to the second wall part 22 and is housed in the lower housing recessed part 24.

Accordingly, the air A having passed through the shut damper 75 flows in a manner shown by arrows with alternate long and two short dashed lines. Specifically, the air A flows straightforward with low pressure loss along the main fin 31, the auxiliary fins 33 and 35 and the second wall part 22 while receiving substantially no resistance from the auxiliary fins 33 and 35. Then, the air A for air conditioning flows out of the supply opening 14. The cam member 67 is arranged lateral to a region between the second wall parts 22. This prevents the cam member 67 from sticking outward from the case 10.

The upper fin shaft 34 is arranged in an upper portion of the bearing part 26 whereas the lower fin shaft 36 is arranged in a lower portion of the bearing part 27. Accordingly, the fin shaft 34 does not exist in a lower portion of the bearing part 26 whereas the fin shaft 36 does not exist in an upper portion of the bearing part 27. As a result, the lower portion of the bearing part 26 where the fin shaft 34 does not exist and the upper portion of the beating part 27 where the fin shaft 36 does not exist become through holes. In this case, the two through holes formed of the bearing parts 26 and 27 are only the through holes recognized visually inside the case 10. This is for the reason that the transmission shafts 64 and 66 of the auxiliary fins 33 and 35 respectively are arranged outside of the first wall part 21, specifically for the reason that the first wall part 21 is not required to be given holes to let the transmission shafts 64 and 66 pass therethrough.

The first wall part 21 is not given a hole either to let the transmission shaft 62 of the main fin 31 pass therethrough. This is for the reason that the arm 61 and the transmission shaft 62 are arranged outside of the first wall part 21. Specifically, only the fin shaft 32 of the main fin 31 passes through the first wall part 21. This reduces the number of holes in the first wall part 21, thereby reducing the number of holes further recognized visually inside the case 10.

In the aforementioned condition, in response to application of upward force to the operation knob 40, the main fin 31 rotates clockwise about the fin shaft 32 as shown in FIGS. 13A, 13B, 14 and 15. The arm 61 rotates clockwise about the fin shaft 32 together with the main fin 31. Further, the transmission shaft 62 rotates clockwise around the fin shaft 32. At this time, downward force is applied to the cam member 67 from the transmission shaft 62 through the inner wall surface of the long hole 68. This rotates the cam member 67 anticlockwise about the support shaft 28.

In response to the rotation of the cam member 67, the cam holes 69 and 70 rotate anticlockwise around the support shaft 28 to change the positions of the transmission shafts 64 and 66. The position change of the transmission shaft 64 changes the posture of the arm 63 from a posture facing in the substantially plumb direction. At this time, the upper auxiliary fin 33 rotates clockwise about the fin shaft 34 moving down in the bearing part 26 with the downstream end of the auxiliary fin 33 moving toward the upper second wall part 22. As a result, the upper auxiliary fin 33 is tilted such that its downstream side is arranged in a higher position. When the main fin 31 is tilted to its maximum angle, each of the transmission shafts 64 moves to an upstream end of corresponding one of the cam holes 69.

The position change of the transmission shaft 66 changes the posture of the arm 65 from a posture facing in the substantially plumb direction. At this time, the lower auxiliary fin 35 rotates clockwise about the fin shaft 36 moving up in the bearing part 27 with the upstream end of the auxiliary fin 35 moving toward the lower second wall part 22. As a result, the lower auxiliary fin 35 is tilted such that its downstream side is arranged in a higher position. When the main fin 31 is tilted to its maximum angle, each of the transmission shafts 66 moves to a downstream end of corresponding one of the cam holes 70. Thus, the air A flowing in the ventilating path 20 is caused to flow obliquely upward through the supply opening 14 by the main fin 31 and the auxiliary fins 33 and 35.

At this time, the cam member 67 is arranged lateral to the region between the second wall parts 22 and does not stick outward from the case 10. Further, the upper fin shaft 34 is arranged in the lower portion of the bearing part 26. The fin shaft 34 is arranged in a lower position than the tilted auxiliary fin 33. Accordingly, when the inside of the case 10 is viewed, the bearing part 26 is not seen as a through hole while an outline of the lower portion of the bearing part 26 is recognized visually. At this time, the lower fin shaft 36 is arranged in the upper portion of the bearing part 27. The fin shaft 36 is arranged in a higher position than the tilted auxiliary fin 35. Accordingly, when the inside of the case 10 is viewed, the upper portion of the bearing part 27 is hidden by the auxiliary fin 35 so that it becomes substantially invisible.

In the aforementioned condition, in response to application of downward force to the operation knob 40, operations opposite to the series of the aforementioned operations are performed to arrange the main fin 31 and the auxiliary fins 33 and 35 substantially parallel to the second wall part 22. When downward force is applied further to the operation knob 40, the main fin 31 rotates anticlockwise about the fin shaft 32 as shown in FIGS. 16A, 16B, 17 and 18. The arm 61 rotates anticlockwise about the fin shaft 32 together with the main fin 31. Further, the transmission shaft 62 rotates anticlockwise around the fin shaft 32. At this time, upward force is applied to the cam member 67 from the transmission shaft 62 through the inner wall surface of the long hole 68. This rotates the cam member 67 clockwise about the support shaft 28.

In response to the rotation of the cam member 67, the cam holes 69 and 70 rotate clockwise around the support shaft 28 to change the positions of the transmission shafts 64 and 66. The position change of the transmission shaft 64 changes the posture of the arm 63 from the posture facing in the substantially plumb direction. At this time, the upper auxiliary fin 33 rotates anticlockwise about the fin shaft 34 moving down in the bearing part 26 with the upstream end of the auxiliary fin 33 moving toward the upper second wall part 22. As a result, the upper auxiliary fin 33 is tilted such that its downstream side is arranged in a lower position. When the main fin 31 is tilted to its maximum angle, each of the transmission shafts 64 moves to a downstream end of corresponding one of the cam holes 69.

The position change of the transmission shaft 66 changes the posture of the arm 65 from the posture facing in the substantially plumb direction. At this time, the lower auxiliary fin 35 rotates anticlockwise about the fin shaft 36 moving up in the bearing part 27 with the downstream end of the auxiliary fin 35 moving toward the lower second wall part 22. As a result, the lower auxiliary fin 35 is tilted such that its downstream side is arranged in a lower position. When the main fin 31 is tilted to its maximum angle, each of the transmission shafts 66 moves to an upstream end of corresponding one of the cam holes 70. Thus, the air A flowing in the ventilating path 20 is caused to flow obliquely downward through the supply opening 14 by the main fin 31 and the auxiliary fins 33 and 35.

At this time, the cam member 67 is arranged lateral to the region between the second wall parts 22 and does not stick outward from the case 10. Further, the upper fin shaft 34 is arranged in the lower portion of the bearing part 26. The fin shaft 34 is arranged in a lower position than the tilted auxiliary fin 33. Accordingly, when the inside of the case 10 is viewed, the lower portion of the bearing part 26 is hidden by the auxiliary fin 33 so that it becomes substantially invisible. At this time, the lower fin shaft 36 is arranged in the upper portion of the bearing part 27. The fin shaft 36 is arranged in a higher position than the tilted auxiliary fin 35. Accordingly, when the inside of the case 10 is viewed, bearing part 27 is not seen as a through hole while an outline of the upper portion of the bearing part 27 is recognized visually.

In the aforementioned condition, in response to application of upward force to the operation knob 40, operations opposite to the series of the aforementioned operations are performed to arrange the main fin 31 and the auxiliary fins 33 and 35 substantially parallel to the second wall part 22.

As shown in FIG. 9, in response to application of force acting in the first direction to the operation knob 40, the operation knob 40 makes sliding movement in the first direction on the main fin 31. At this time, the force applied to the operation knob 40 is transmitted through the fork part 41 to the transmission shaft part 57 of the central upstream side fin 50. The upstream side fin 50 rotates about the fin shaft 52 in a direction same as the direction where the operation knob 40 is operated. At this time, as shown by alternate long and two short dashed lines of FIG. 9, the transmission shaft part 57 rotates around the fin shaft 52 while the upstream side fin 50 rotates about the fin shaft 52. The movement of the upstream side fin 50 is transmitted to the upstream side fin 51 through the arm 53, the coupling shaft 54, and the coupling rod 55 shown in FIG. 11. Then, all the upstream side fins 51 rotate in synchronous with the upstream side fin 50 in the direction same as the direction where the operation knob 40 is operated. The air A is caused to flow through the supply opening 14 in a prescribed direction by the upstream side fins 50 and 51.

Accordingly, the first embodiment achieves the following effects.

(1) The first wall part 21 is provided with the pair of upper and lower bearing parts 26 and 27. The fin shafts 34 and 36 of the auxiliary fins 33 and 35 pass through the bearing parts 26 and 27 respectively. The transmission shafts 64 and 66 coupled to the fin shafts 34 and 36 respectively are arranged outside of the first wall part 21. The cam member 67 is rotationally arranged outside of the first wall part 21. The cam member 67 is provided with the cam holes 69 and 70 as fitting targets. The transmission shafts 64 and 66 are fitted in the cam holes 69 and 70 respectively of the cam member 67. The first wall part 21 is provided with the bearing part 25.

The main fin 31 is rotationally supported by the bearing part 25 through the fin shaft 32. Rotation of the main fin 31 is transmitted through the transmission unit B to the cam member 67, thereby rotating the cam member 67.

In this structure, the cam member 67 rotates in response to the rotation of the main fin 31, thereby rotating the auxiliary fins 33 and 35. Thus, the cam member 67 does not stick outward from the case 10. This can suppress interference between the cam member 67 and a part around the case 10. The arm 63 including the pair of transmission shafts 64 is coupled to an external end of the fin shaft 34. The arm 65 including the pair of transmission shafts 66 is coupled to an external end of the fin shaft 36. Both the transmission shafts 64 and 66 are arranged outside of the first wall part 21. This structure can reduce the number of holes in the first wall part 21. This reduces the number of holes recognized visually inside the case 10, thereby improving the appearance.

(2) The fin shaft 32 of the main fin 31 is rotationally supported by the bearing part 25 penetrating through the first wall part 21. The transmission unit B is formed of the arm 61, the transmission shaft 62, and the long hole 68 of the cam member 67 that are arranged outside of the first wall part 21. The arm 61 extends in a direction orthogonal to the fin shaft 32. The transmission shaft 62 is formed in a position on the arm 61 shifted from the fin shaft 32. The transmission shaft 62 is fitted in the long hole 68 as a transmission fitting target. In this structure, rotation of the main fin 31 can be transmitted to the cam member 67 through the arm 61, the transmission shaft 62, and the inner wall surface of the long hole 68, thereby allowing rotation of the cam member 67. Additionally, the first wall part 21 is not required to be given a hole to let the transmission shaft 62 pass therethrough. This reduces the number of holes further in the first wall part 21, thereby reducing the number of holes further recognized visually inside the case 10. This further improves the appearance.

(Second Embodiment)

The following describes a second embodiment of the register for air conditioning by referring to FIGS. 19 to 29. In the following, differences from the first embodiment are mainly described.

Figure 19:
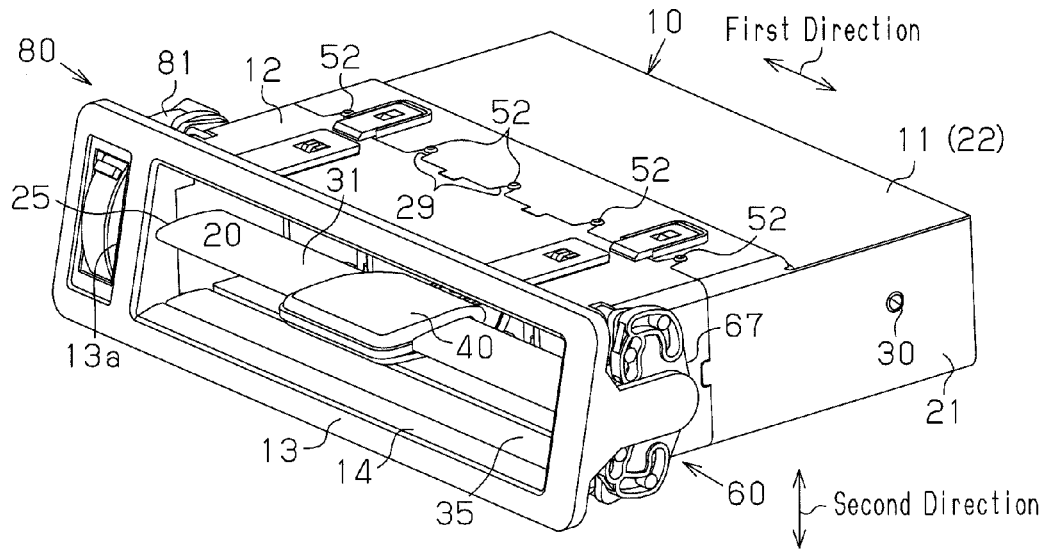
FIG. 19 is a perspective view showing a register for air conditioning according to a second embodiment of this invention.

As shown in FIG. 19, the bearing part 25 is formed in an area where the downstream side retainer 12 and the bezel 13 are coupled. The main fin 31 is supported by the bearing parts 25 of the first wall parts 21. The bearing part 25 is arranged on a slightly upstream side relative to the bearing part 25 of the first embodiment. The position change of the bearing part 25 results from the position change of the fin shafts 32 of the main fin 31.

Figure 20:
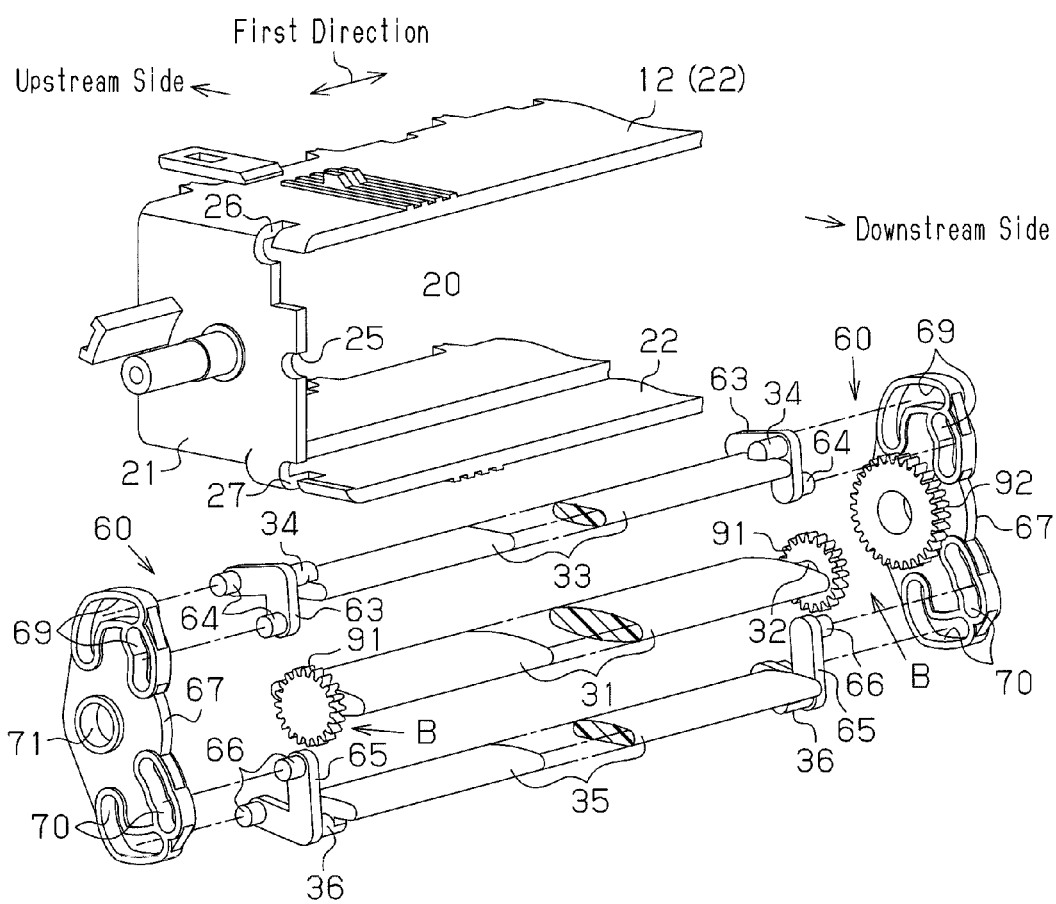
FIG. 20 is an exploded perspective view showing a downstream side retainer, a main fin, auxiliary fins, and cam members.

As shown in FIG. 20, the fin shafts 32 project outward from opposite end surfaces of the main fin 31. In the main fin 31, each of the fin shafts 32 is arranged in the center of the ventilating direction. The fin shafts 32 are supported by the first wall parts 21 through the bearing parts 25 such that they can rotate in the second direction.

The fin shaft 32 projects outward from the first wall part 21. A drive gear 91 is fixed to an external end of the fin shaft 32. The main fin 31 includes the drive gear 91 instead of the arm 61 and the transmission shaft 62 of the first embodiment. A driven gear 92 is fixed to the inner side surface of each of the cam members 67. The driven gear 92 is provided around the shaft hole 71. The driven gear 92 forms meshing engagement with the drive gear 91. The drive gear 91 and the driven gear 92 form a transmission unit B to transmit rotation of the main fin 31 to the cam member 67. The long hole 68 of the first embodiment is omitted from the cam member 67.

The upper bearing part 26 is formed slightly above the upper bearing part 26 of the first embodiment. An upper portion of the bearing part 26 is formed in a boundary area between the upper second wall part 22 and the first wall part 21. The lower bearing part 27 is formed slightly below the lower bearing part 27 of the first embodiment. A lower portion of the bearing part 27 is formed in a boundary area between the lower second wall part 22 and the first wall part 21. The fin shaft 34 of the upper auxiliary fin 33 is formed above the center of the auxiliary fin 33. The fin shaft 36 of the lower auxiliary fin 33 is formed below the center of the auxiliary fin 35.

The arms 63 and 65 are both formed into an L shape. Each of the upper arms 63 has a bent part coupled to an external end of the fin shaft 34 of the upper auxiliary fin 33. Each of the lower arms 65 has a bent part coupled to an external end of the fin shaft 36 of the lower auxiliary fin 35. The two transmission shafts 64 are formed at corresponding end portions of each of the upper arms 63. The two transmission shafts 66 are formed at corresponding end portions of each of the lower arms 65.

As shown in FIG. 22, the coupling shaft 54 projects upward from an upper end surface of the upstream side fins 50 and each of the upstream side fins 51. The coupling shaft 54 is arranged on an upstream side relative to the fin shaft 52. The elongated coupling rod 55 extending in the first direction is arranged in the case 10. The respective coupling shafts 54 of the upstream side fins 50 and 51 are coupled to each other through the coupling rod 55. The arm 53 of the first embodiment is omitted from the upstream side fins 50 and 51. The upstream side fins 50 and 51, the fin shaft 52, the coupling shaft 54, and the coupling rod 55 form a parallel link mechanism to rotate all the upstream side fins 51 in synchronous with the upstream side fin 50.

The action of the register for air conditioning of the second embodiment is described next.

FIGS. 21 to 23 show the register for air conditioning with the main fin 31 substantially parallel to the second wall parts 22. Each of the transmission shafts 64 of the upper auxiliary fin 33 is arranged in the center of corresponding one of the cam holes 69. At this time, the upper auxiliary fin 33 is arranged substantially parallel to the second wall parts 22 and is housed in the upper housing recessed part 24. Each of the transmission shafts 66 of the lower auxiliary fin 35 is arranged in the center of corresponding one of the cam holes 70. The lower auxiliary fin 35 is arranged substantially parallel to the second wall parts 22 and is housed in the lower housing recessed part 24.

Accordingly, the air A for air conditioning having passed through the upstream side fins 50 and 51 blows out of the supply opening 14. At this time, the air A flows straightforward with low pressure loss along the main fin 31, the auxiliary fins 33 and 35 and the second wall part 22 while receiving substantially no resistance from the auxiliary fins 33 and 35. The cam member 67 is arranged lateral to a region between the second wall parts 22. This prevents the cam member 67 from sticking outward from the case 10.

The upper fin shaft 34 is arranged in the upper portion of the bearing part 26. As shown in FIG. 20, the upper portion of the bearing part 26 is formed in the boundary area between the upper second wall part 22 and the first wall part 21. As shown in FIGS. 22 and 23, the upper portion of the bearing part 26 is arranged above the auxiliary fin 33. Thus, when the inside of the case 10 is viewed, the upper portion of the bearing part 26 is hidden by the auxiliary fin 33 so that it becomes invisible.

The lower fin shaft 36 is arranged in the lower portion of the bearing part 27. As shown in FIG. 20, the lower portion of the bearing part 27 is formed in the boundary area between the lower second wall part 22 and the first wall part 21. As shown in FIGS. 22 and 23, the lower portion of the bearing part 27 is arranged below the auxiliary fin 35. Thus, when the inside of the case 10 is viewed, the lower portion of the bearing part 27 is hidden by the auxiliary fin 35 so that it becomes invisible.

The fin shaft 34 does not exist in a lower portion of the bearing part 26 whereas the fin shaft 36 does not exist in an upper portion of the bearing part 27. Meanwhile, the upper auxiliary fin 33 is arranged inside the lower portion of the bearing part 26 whereas the lower auxiliary fin 35 is arranged inside the upper portion of the bearing part 27. Thus, when the inside of the case 10 is viewed, the bearing parts 26 and 27 are not seen as through holes while the outlines of the bearing parts 26 and 27 are recognized visually. In this case, the two holes formed of the bearing parts 26 and 27 are only the holes recognized visually inside the case 10. This is for the reason that the transmission shafts 64 and 66 of the auxiliary fins 33 and 35 respectively are arranged outside of the first wall part 21, specifically for the reason that the first wall part 21 is not required to be given holes to let the transmission shafts 64 and 66 pass therethrough.

The transmission shaft 62 of the main fin 31 is not formed in the second embodiment. Accordingly, a hole to let the transmission shaft 62 pass therethrough is made unnecessary in the first wall part 21. Thus, unlike the invention of European Patent Application Publication No. 2602137, this hole becomes invisible. Only the fin shaft 32 of the main fin 31 passes through the first wall part 21. This reduces the number of holes in the first wall part 21, thereby further reducing the number of holes recognized visually inside the case 10.

In the aforementioned condition, in response to application of upward force to the operation knob 40, the main fin 31 rotates clockwise about the fin shaft 32 as shown in FIGS. 24 to 26. The rotation of the main fin 31 rotates the drive gear 91 clockwise around the fin shaft 32. Then, the driven gear 92 in meshing engagement with the drive gear 91 rotates anticlockwise about the support shaft 28, thereby rotating the cam member 67 anticlockwise about the support shaft 28 together with the driven gear 92.

In response to the rotation of the cam member 67, the cam holes 69 and 70 rotate anticlockwise around the support shaft 28 to change the positions of the transmission shafts 64 and 66. The position change of the transmission shaft 64 changes the posture of the arm 63. At this time, the upper auxiliary fin 33 rotates clockwise about the fin shaft 34 moving down in the bearing part 26 with a downstream end of the auxiliary fin 33 moving toward the upper second wall part 22. As a result, the upper auxiliary fin 33 is tilted such that its downstream side is arranged in a higher position. When the main fin 31 is tilted to its maximum angle, each of the transmission shafts 64 moves to an upstream end of corresponding one of the cam holes 69.

The position change of the transmission shaft 66 changes the posture of the arm 65. At this time, the lower auxiliary fin 35 rotates clockwise about the fin shaft 36 moving up in the bearing part 27 with an upstream end of the auxiliary fin 35 moving toward the lower second wall part 22. As a result, the lower auxiliary fin 35 is tilted such that its downstream side is arranged in a higher position. When the main fin 31 is tilted to its maximum angle, each of the transmission shafts 66 moves to a downstream end of corresponding one of the cam holes 70. Thus, the air A flowing in the ventilating path 20 is caused to flow obliquely upward through the supply opening 14 by the main fin 31 and the auxiliary fins 33 and 35.

At this time, the cam member 67 is arranged lateral to the region between the second wall parts 22 and does not stick outward from the case 10. Further, the upper fin shaft 34 is arranged in the lower portion of the bearing part 26. The fin shaft 34 is arranged in a higher position than the tilted auxiliary fin 33. Additionally, the bearing part 26 is formed above the bearing part 26 of the first embodiment. Accordingly, when the inside of the case 10 is viewed, the bearing part 26 is hidden by the auxiliary fin 33 so that it becomes invisible. Thus, the bearing part 26 is not seen as a through hole. At this time, the lower fin shaft 36 is arranged in the upper portion of the bearing part 27. The fin shaft 36 is arranged in a lower position than the tilted auxiliary fin 35. The bearing part 27 is formed below the bearing part 27 of the first embodiment. Thus, when the inside of the case 10 is viewed, not many portions of the bearing part 27 actually become visible while the bearing part 27 is recognized visually.

Figures 27A, 27B:
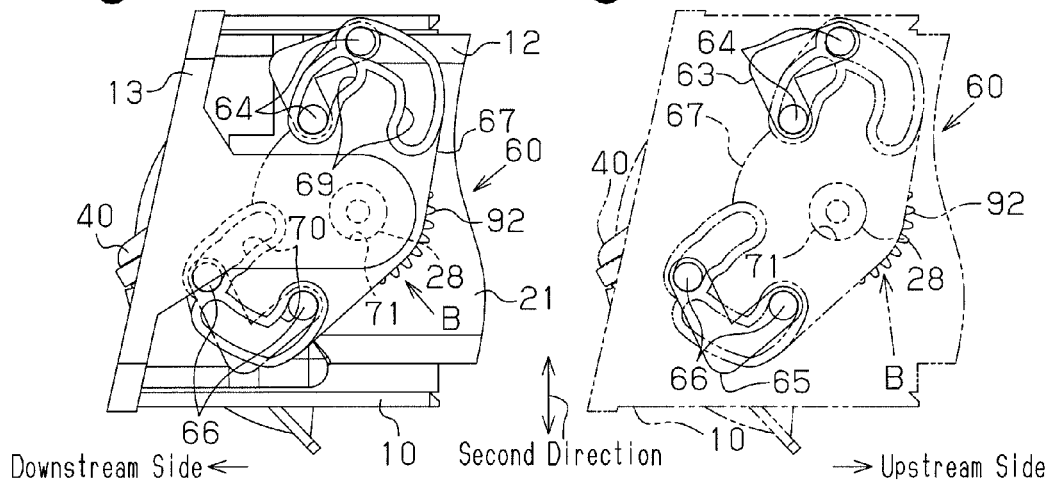
FIG. 27A is a partial right side view of the register for air conditioning where the main fin is tilted such that the downstream side of the main fin is arranged in a lower position.
FIG. 27B is a partial right side view showing relationships between the arms, the transmission shafts, and the parts around the arms and the transmission shafts.
Figure 28:
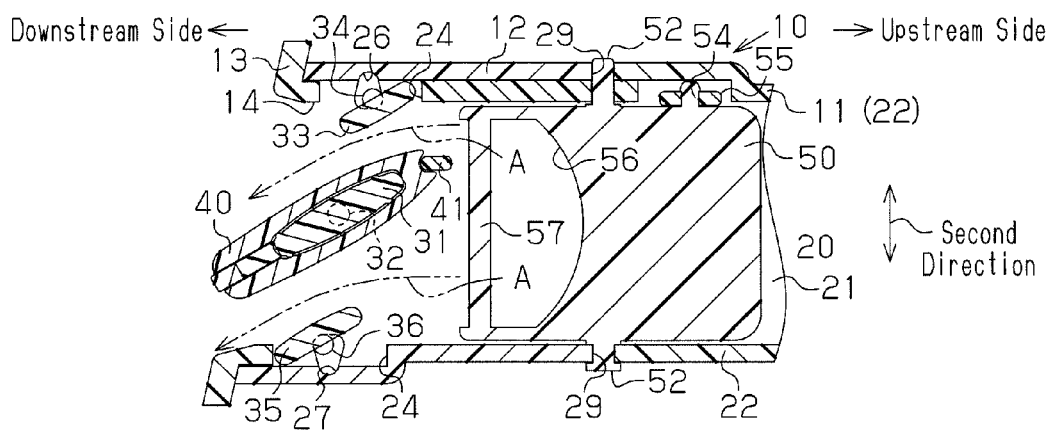
FIGS. 28 and 29 are partial side sectional views of the register for air conditioning where the main fin is tilted such that the downstream side of the main fin is arranged in a lower position.
Figure 29:
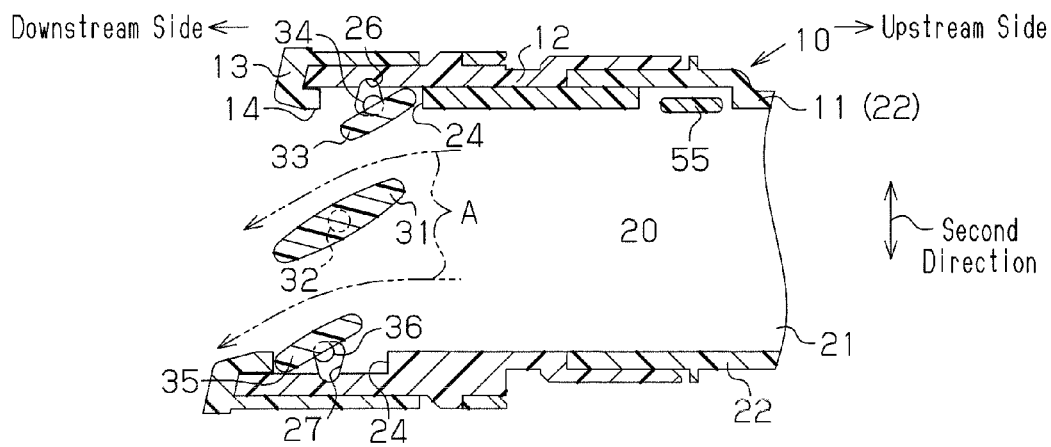

In the aforementioned condition, in response to application of downward force to the operation knob 40, operations opposite to the series of the aforementioned operations are performed to arrange the main fin 31 and the auxiliary fins 33 and 35 substantially parallel to the second wall part 22. When downward force is applied further to the operation knob 40, the main fin 31 rotates anticlockwise about the fin shaft 32 as shown in FIGS. 27 to 29. The rotation of the main fin 31 rotates the drive gear 91 anticlockwise around the fin shaft 32. Then, the driven gear 92 in meshing engagement with the drive gear 91 rotates clockwise about the support shaft 28, thereby rotating the cam member 67 clockwise about the support shaft 28 together with the driven gear 92.

In response to the rotation of the cam member 67, the cam holes 69 and 70 rotate clockwise around the support shaft 28 to change the positions of the transmission shafts 64 and 66. The position change of the transmission shaft 64 changes the posture of the arm 63. At this time, the upper auxiliary fin 33 rotates anticlockwise about the fin shaft 34 moving down in the bearing part 26 with an upstream end of the auxiliary fin 33 moving toward the upper second wall part 22. As a result, the upper auxiliary fin 33 is tilted such that its downstream side is arranged in a lower position. When the main fin 31 is tilted to its maximum angle, each of the transmission shafts 64 moves to a downstream end of corresponding one of the cam holes 69.

The position change of the transmission shaft 66 changes the posture of the arm 65. At this time, the lower auxiliary fin 35 rotates anticlockwise about the fin shaft 36 moving up in the bearing part 27 with a downstream end of the auxiliary fin 35 moving toward the lower second wall part 22. As a result, the lower auxiliary fin 35 is tilted such that its downstream side is arranged in a lower position. When the main fin 31 is tilted to its maximum angle, each of the transmission shafts 66 moves to an upstream end of corresponding one of the cam holes 70. Thus, the air A flowing in the ventilating path 20 is caused to flow obliquely downward through the supply opening 14 by the main fin 31 and the auxiliary fins 33 and 35.

At this time, the cam member 67 is arranged lateral to the region between the second wall parts 22 and does not stick outward from the case 10. Further, the upper fin shaft 34 is arranged in the lower portion of the bearing part 26. The fin shaft 34 is arranged in a higher position than the tilted auxiliary fin 33. Additionally, the bearing part 26 is formed above the bearing part 26 of the first embodiment. Thus, when the inside of the case 10 is viewed, not many portions of the bearing part 26 become actually visible while the bearing part 26 is recognized visually. At this time, the lower fin shaft 36 is arranged in the upper portion of the bearing part 27. The fin shaft 36 is arranged in a lower position than the tilted auxiliary fin 35. Accordingly, when the inside of the case 10 is viewed, the fin shaft 36 and the bearing part 27 are hidden by the auxiliary fin 35 so that they become invisible. Thus, the bearing part 27 is not seen as a through hole.

In the aforementioned condition, in response to application of upward force to the operation knob 40, operations opposite to the series of the aforementioned operations are performed to arrange the main fin 31 and the auxiliary fins 33 and 35 substantially parallel to the second wall part 22.

Accordingly, the second embodiment achieves the following effects in addition to the aforementioned effect (1).

(3) The drive gear 91 fixed to the fin shaft 32 of the main fin 31 is arranged outside of the first wall part 21. The cam member 67 is provided with the driven gear 92 in meshing engagement with the drive gear 91. The drive gear 91 and the driven gear 92 form the transmission unit B. In this structure, rotation of the main fin 31 is transmitted to the cam member 67 through the drive gear 91 and the driven gear 92, thereby rotating the cam member 67. This reduces fluctuations of a load for the rotation of the main fin 31 about the fin shaft 32. Further, a hole to let the transmission shaft 62 pass therethrough shown in FIG. 5 is made unnecessary in the first wall part 21. This reduces the number of holes in the first wall part 21, thereby further reducing the number of holes recognized visually inside the case 10. This further improves the appearance.

(4) The fin shafts 34 and 36 are arranged between the center of the thickness direction of the auxiliary fin 33 and the second wall part 22 and between the center of the thickness direction of the auxiliary fin 35 and the second wall part 22 respectively. In this structure, when the inside of the case 10 is viewed, many portions of the bearing parts 26 and 27 are placed at the back of the auxiliary fins 33 and 35 respectively and many portions of the bearing parts 26 and 27 are invisible. This further improves the appearance.

(5) The bearing parts 26 and 27 are each partially located in the boundary area between the first and second wall parts 21 and 22. In this case, the bearing parts 26 and 27 are each placed in a position of the first wall part 21 nearest the second wall part 22. Thus, more portions of the bearing parts 26 and 27 are placed at the back of the auxiliary fins 33 and 35 respectively. Thus, more portions of the bearing parts 26 and 27 become invisible, thereby enhancing a visual quality further.

The aforementioned embodiments can be changed as follows.

As long as each of the bearing parts 26 is 27 is at least partially formed in a position of the first wall part 21 near the second wall part 22, the shape and the size of the bearing part 26 or 27 can be changed.

In the first embodiment, the bearing part 26 or 27 may be partially formed in a boundary area between the second and first wall parts 22 and 21. In the second embodiment, the bearing part 26 or 27 may be formed entirely in the first wall part 21.

The auxiliary fins 33 and 35 are rotated substantially parallel to the main fin 31. Alternatively, with the intention of enhancing the directivity of the air A for air conditioning, at least one of the auxiliary fins 33 and 35 may be tilted such that their downstream sides get closer to the main fin 31. The directivity of the air A is improved by tilting at least one of the auxiliary fins 33 and 35 relative to the main fin 31 by about five degrees.

In the first embodiment, the fin shaft 34 or 36 may be arranged between the center of the thickness direction of the auxiliary fin 33 or 35 and the second wall part 22. In the second embodiment, the fin shaft 34 or 36 may be arranged in the center of the thickness direction of the auxiliary fin 33 or 35, or between the center of the thickness direction of the auxiliary fin 33 or 35 and the main fin 31.

The cam member 67 may include a cam groove as a groove part not penetrating through the cam member 67 instead of the cam holes 69 and 70 as fitting targets and the long hole 68 as a transmission fitting target.

In the second embodiment, an additional gear may be arranged between the drive gear 91 and the driven gear 92 and each of the drive gear 91 and the driven gear 92 may form meshing engagement with the additional gear.

The register for air conditioning may be attached to a place different from an instrument panel.

The register for air conditioning may be used for purposes except for purposes relating to a vehicle, as long as it adjusts the direction of the air A for air conditioning blowing out of an air conditioner into a room.

The register for air conditioning may be a register for air conditioning including a vertically-long supply opening 14. In this case, the vertical direction of the register for air conditioning becomes the first direction and the direction of the width of a vehicle becomes the second direction. Wall parts opposite each other in the vertical direction become the first wall parts 21 and wall parts opposite each other in the direction of the width of a vehicle become the second wall parts 22. The main fin 31 and the auxiliary fins 33 and 35 are arranged in the second direction whereas the upstream side fins 50 and 51 are arranged in the first direction.

The downstream side fin group may be formed of the pair of auxiliary fins 33 and 35, the main fin 31, and multiple intermediate fins arranged between the auxiliary fins 33 and 35 and the main fin 31.

Members, places of such members and the like not directly relating to the characteristic features of this invention such as the upstream side fins 50 and 51 can be omitted or can be changed in shape or number, for example.

The invention claimed is:

1. A register for air conditioning comprising:
   a cylindrical case formed of two first wall parts that are opposite each other in a first direction and two second wall parts that are opposite each other in a second direction, which is substantially orthogonal to the first direction, wherein the case has a dimension in the first direction that is larger than a dimension in the second direction;
   two auxiliary fins arranged in the case near corresponding ones of the second wall parts, wherein the auxiliary fins extend in the first direction and rotate in the second direction about corresponding fin shafts;
   a main fin arranged between the auxiliary fins and supported by each of the first wall parts through a fin shaft, wherein the main fin extends in the first direction and rotates in the second direction; and
   an interlock mechanism to rotate each of the auxiliary fins while moving at least one of an upstream end and a downstream end of each of the auxiliary fins toward one of the second wall parts in response to rotation of the main fin,
   the interlock mechanism including:
   two bearing parts formed in the first wall parts near the second wall parts, wherein the bearing parts permit the fin shafts of each of the auxiliary fins to pass therethrough such that the fin shafts of each of the auxiliary fins become closer to and farther from one of the second wall parts;
   two transmission shafts arranged outside of each of the first wall parts, wherein the transmission shafts are coupled to each of the fin shafts passing through the bearing parts;
   a cam member rotationally arranged outside of each of the first wall parts, wherein the cam member has a fitting target in which each of the transmission shafts is fitted, the fitting target being formed of a groove part or a long hole; and
   a transmission unit to rotate the cam member by transmitting rotation of the main fin to the cam member.

2. The register for air conditioning according to claim 1, wherein
   the fin shaft of the main fin penetrates through each of the first wall parts, and
   the transmission unit includes:
   an arm provided outside of each of the first wall parts, the arm extending from the fin shaft of the main fin in a direction orthogonal to the fin shaft of the main fin;
   a transmission shaft provided in a position on the arm shifted from the fin shaft of the main fin; and
   a transmission fitting target formed in the cam member, the transmission fitting target receiving the transmission shaft of the transmission unit, the transmission fitting target being formed of a groove part or a long hole.

3. The register for air conditioning according to claim 1, wherein
   the fin shaft of the main fin penetrates through each of the first wall parts, and
   the transmission unit includes:
   a drive gear provided outside of each of the first wall parts and fixed to the fin shaft of the main fin; and
   a driven gear provided to the cam member, the driven gear forming meshing engagement with the drive gear.

4. The register for air conditioning according to claim 1, wherein the fin shafts of each of the auxiliary fins are arranged between the center of a thickness direction of this auxiliary fin and one of the second wall parts.

5. The register for air conditioning according to claim 4, wherein each of the bearing parts is partially formed in a boundary area between one of the second wall parts and one of the first wall parts.

* * * * *